US011973291B2

(12) United States Patent
Sakai

(10) Patent No.: US 11,973,291 B2
(45) Date of Patent: Apr. 30, 2024

(54) FIRST CONNECTOR, SECOND CONNECTOR AND CONNECTOR ASSEMBLY

(71) Applicant: SUMITOMO WIRING SYSTEMS, LTD., Mie (JP)

(72) Inventor: Hiroki Sakai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 351 days.

(21) Appl. No.: 17/533,544

(22) Filed: Nov. 23, 2021

(65) Prior Publication Data

US 2022/0173544 A1 Jun. 2, 2022

(30) Foreign Application Priority Data

Nov. 30, 2020 (JP) ................................ 2020-198237
Apr. 12, 2021 (JP) ................................ 2021-066987

(51) Int. Cl.
*H01R 13/453* (2006.01)
*H01R 13/502* (2006.01)

(52) U.S. Cl.
CPC ....... *H01R 13/4538* (2013.01); *H01R 13/502* (2013.01)

(58) Field of Classification Search
CPC .. H01R 13/4538; H01R 13/502; H01R 13/44; H01R 13/629; H01R 24/00
See application file for complete search history.

(56) References Cited

U.S. PATENT DOCUMENTS

| | | | | | |
|---|---|---|---|---|---|
| 8,597,062 | B2 * | 12/2013 | Casses | H01R 4/184 | 439/732 |
| 9,059,540 | B2 * | 6/2015 | Menez | H01R 13/641 | |
| 9,407,037 | B2 * | 8/2016 | Kim | H01R 13/62938 | |
| 2011/0177722 | A1 * | 7/2011 | Casses | H01R 4/184 | 439/660 |
| 2015/0295352 | A1 * | 10/2015 | Kim | H01R 13/62938 | 439/157 |
| 2016/0064849 | A1 * | 3/2016 | Eckel | H01R 13/44 | 439/135 |
| 2017/0117660 | A1 * | 4/2017 | Furuya | H01R 13/5219 | |
| 2017/0244191 | A1 * | 8/2017 | Furuya | H01R 13/4538 | |
| 2022/0173544 | A1 * | 6/2022 | Sakai | H01R 13/502 | |

* cited by examiner

*Primary Examiner* — Abdullah A Riyami
*Assistant Examiner* — Nader J Alhawamdeh
(74) *Attorney, Agent, or Firm* — Venjuris, P.C.

(57) ABSTRACT

A first connector includes a first terminal member having a tip side extending in a first direction X1, a first connector housing for holding the first terminal member, and a slide member to be held in the first connector housing. The first connector housing includes a protecting portion for covering the first terminal member except a part on a side in a second direction Y1 orthogonal to the first direction X1, out of surrounding sides orthogonal to the first direction X1, a first opening open in the first direction X1 in the protecting portion, and a second opening open in the second direction Y1 in the protecting portion. The slide member is slidable in a first opposite direction X2 opposite to the first direction X1 from a closing position for closing the second opening to an opening position.

15 Claims, 18 Drawing Sheets

FIRST CONNECTOR, SECOND CONNECTOR AND CONNECTOR ASSEMBLY

CROSS-REFERENCE TO RELATED APPLICATIONS

This application is based on and claims priority from Japanese Patent Application Nos. 2020-198237 and 2021-066987 filed on Nov. 30, 2020 and Apr. 12, 2021, respectively, with the Japan Patent Office, the disclosures of which are incorporated herein in their entireties by reference.

TECHNICAL FIELD

The present disclosure relates to a first connector, a second connector and a connector assembly.

BACKGROUND

Conventionally, a vehicle such as a hybrid or electric vehicle includes in-vehicle devices such as a high-voltage battery and an inverter. The in-vehicle devices are connected to each other via a wiring harness and connectors. A connector housing of such a connector generally includes a protecting portion for covering a terminal on sides other than a side in a tip direction, but the protecting portion may be partially cut to route a terminal of a mating connector to be connected to the terminal in an orthogonal direction (see, for example, Japanese Patent Laid-open Publication No. 2016-522550). In such a connector, a protecting member made of resin is provided not only on a tip side of the terminal, but also on sides of the terminal orthogonal to an extending direction of the terminal to prevent an electric shock by the touch of a finger or the like with the terminal.

SUMMARY

However, in the connector as described above, there has been a problem that the shape of the terminal and that of the protecting member are complicated since the protecting member is provided also on the sides of the terminal orthogonal to the extending direction of the terminal.

The present disclosure aims to provide a first connector, a second connector and a connector assembly capable of simplifying the configuration of a terminal while providing an electric shock prevention measure.

This object is solved according to the invention by the features of the independent claims. Particular embodiments are subject of the dependent claims.

According to one aspect, there is provided a first connector of the present disclosure includes at least one first terminal member having a tip side extending in a first direction, a first connector housing for holding the first terminal member, and at least one slide member to be held in the first connector housing, wherein the first connector housing includes a protecting portion for at least partly covering the first terminal member except a part on a side in a second direction orthogonal to the first direction, out of surrounding sides orthogonal to the first direction, a first opening open in the first direction in the protecting portion, and a second opening open in the second direction in the protecting portion, and the slide member is slidable in a first opposite direction substantially opposite to the first direction from a closing position for at least partly closing the second opening to an opening position.

A second connector of the present disclosure is a second connector attachable to and detachable from a first connector, the first connector including at least one first terminal member having a tip side extending in a first direction, a first connector housing for holding the first terminal member, and at least one slide member to be held in the first connector housing, the first connector housing including a protecting portion for at least partly covering the first terminal member except a part on a side in a second direction orthogonal to the first direction, out of surrounding sides orthogonal to the first direction, a first opening open in the first direction in the protecting portion, and a second opening open in the second direction in the protecting portion, and the slide member being slidable in a first opposite direction substantially opposite to the first direction from a closing position for at least partly closing the second opening to an opening position, the second connector including at least one pressing portion for sliding the slide member to the opening position by pressing or engaging at least one pressed portion provided on the slide member when the second connector is attached to the first connector, and at least one engaging portion for sliding or displacing or displacing the slide member to the closing position by pulling or engaging at least one engaged portion provided in the slide member when the second connector is detached from the first connector.

A connector assembly of the present disclosure includes a first connector and a second connector attachable to and detachable from the first connector, wherein the first connector includes a first terminal member having a tip side extending in a first direction, a first connector housing for holding the first terminal member, and a slide member to be held in the first connector housing, the first connector housing including a protecting portion for covering the first terminal member except a part on a side in a second direction orthogonal to the first direction, out of surrounding sides orthogonal to the first direction, a first opening open in the first direction in the protecting portion, and a second opening open in the second direction in the protecting portion, and the slide member being slidable in a first opposite direction opposite to the first direction from a closing position for closing the second opening to an opening position, and the second connector includes a pressing portion for sliding the slide member to the opening position by pressing a pressed portion provided on the slide member when the second connector is attached to the first connector, and an engaging portion for sliding the slide member to the closing position by pulling an engaged portion provided in the slide member when the second connector is detached from the first connector.

Particular embodiments of the present disclosure are listed and described.

[1] The first connector of the present disclosure particularly includes at least one first terminal member having a tip side extending in a first direction, a first connector housing for holding the first terminal member, and at least one slide member to be held in the first connector housing, wherein the first connector housing includes a protecting portion for at least partly covering the first terminal member except a part on a side in a second direction orthogonal to the first direction, out of surrounding sides orthogonal to the first direction, a first opening open in the first direction in the protecting portion, and a second opening open in the second direction in the protecting portion, and the slide member is slidable or displaceable in a first opposite direction substantially opposite to the first direction from a closing position for at least partly closing the second opening to an opening position.

According to this configuration, since the slide member is provided which is slidable or displaceable from the closing position for closing the second opening open in the second direction to the opening position, the provision of a protecting member in the second direction of the first terminal member is unnecessary. Therefore, the configuration of the first terminal member can be simplified while an electric shock prevention measure is provided.

[2] Preferably, the slide member includes at least one slide-side suppressing portion, and the first connector housing includes at least one connector-side suppressing portion for substantially suppressing a movement of the slide member in the first opposite direction by being engaged with the slide-side suppressing portion with the slide member held or positioned at the closing position.

According to this configuration, since the first connector housing includes the connector-side suppressing portion for suppressing a movement of the slide member at the closing position in the first opposite direction, the slide member is suppressed from easily sliding to the opening position due to vibration or the like. Therefore, the electric shock prevention measure is improved.

[3] Preferably, the slide member includes at least one slide-side restricting portion, and the first connector housing includes at least one connector-side restricting portion for restricting a movement of the slide member in the first direction by being engaged with the slide-side restricting portion with the slide member held or positioned at the closing position.

According to this configuration, since the first connector housing includes the connector-side restricting portion for restricting a movement of the slide member at the closing position in the first direction, the escape of the slide member from the first connector housing is restricted. Therefore, the electric shock prevention measure is improved.

[4] Preferably, the slide member includes at least one pressed portion to be pressed by at least one pressing portion provided in a second connector when the second connector is attached to the first connector and slides to the opening position by the pressed portion being pressed by the pressing portion.

According to this configuration, since the slide member slides to the opening position by the pressed portion being pressed by the pressing portion of the second connector when the second connector is attached to the first connector, the slide member needs not be slid to the opening position, for example, by a jig or the like. That is, a worker can slide the slide member to the opening position without requiring another operation step only by attaching the second connector to the first connector.

[5] Preferably, the slide member includes a plurality of the pressed portions.

According to this configuration, since the slide member includes the plurality of pressed portions, the slide member can be smoothly and stably slid to the opening position as compared to a configuration including a single pressed portion.

[6] Preferably, the slide member includes at least one engaged portion to be pulled or engaged by at least one engaging portion provided in the second connector when the second connector is detached from the first connector and slides to the closing position by the engaged portion being pulled or engaged by the engaging portion.

According to this configuration, since the slide member slides to the closing position by the engaged portion being pressed by the engaging portion of the second connector when the second connector is detached from the first connector, the slide member needs not be slid to the closing position, for example, by a jig or the like. That is, the worker can slide the slide member to the closing position without requiring another operation step only by detaching the second connector from the first connector. Further, if the slide member is biased in the first direction by a biasing member such as a spring, the slide member can be slid to the closing position without requiring another operation step, but the above configuration does not require the biasing member unlike this configuration.

[7] Preferably, the slide member includes a plurality of the engaged portions.

According to this configuration, since the slide member includes the plurality of engaged portions, the slide member can be smoothly and stably slid to the closing position as compared to a configuration including a single engaged portion.

[8] Preferably, the pressed portion and the engaged portion are arranged in an attaching/detaching direction of the first and second connectors.

According to this configuration, since the pressed portion and the engaged portion are arranged in the attaching/detaching direction of the first and second connectors, the slide member can be reduced in size in a width direction, for example, as compared to the case where these are shifted in the width direction.

[9] Preferably, the engaged portion has a first inclined surface inclined with respect to a plane orthogonal to the attaching/detaching direction of the first and second connectors, and the first inclined surface guides and disengages the engaging portion and the engaged portion with the slide member positioned or held at the closing position when the second connector is detached from the first connector.

According to this configuration, since the engaged portion has the first inclined surface for guiding and disengaging the engaging portion and the engaged portion with the slide member held at the closing position when the second connector is detached from the first connector, the engaging portion and the engaged portion can be easily disengaged. That is, the second connector can be easily and properly detached from the first connector.

[10] Preferably, the slide member has a second inclined surface inclined with respect to a plane orthogonal to the attaching/detaching direction of the first and second connectors, and the second inclined surface guides the engaging portion to a position where the engaging portion is engageable with the engaged portion when the second connector is attached to the first connector.

According to this configuration, since the slide member has the second inclined surface for guiding the engaging portion to the position where the engaging portion is engageable with the engaged portion when the second connector is attached to the first connector, the engaging portion and the engaged portion can be easily engaged. That is, the second connector can be easily and properly attached to the first connector.

[11] Preferably, the slide member includes a deflectable piece substantially extending in the first direction and flexible in a direction orthogonal to the first direction, and the engaged portion is provided in the deflectable piece.

According to this configuration, the slide member includes the deflectable piece extending in the first direction and flexible in the direction orthogonal to the first direction and the engaged portion is provided in the deflectable piece, the engaging portion and the engaged portion can be easily engaged by the deflection of the deflectable piece. That is, the engaging portion and the engaged portion can be easily engaged by the deflection of the deflectable piece when the second connector is attached to the first connector. Further, the engaging portion and the engaged portion can be easily disengaged by the deflection of the deflectable piece when the second connector is detached from the first connector.

[12] Preferably, the deflectable piece includes a base end part and a tip part provided on a side opposite to the base end part in the first direction, the engaged portion is provided in the tip part of the deflectable piece, and the base end part of the deflectable piece includes at least one recess recessed in a direction intersecting the first direction.

According to this configuration, the base end part of the deflectable piece becomes thinner by providing the recess. Thus, the flexibility of the deflectable piece can be improved as compared to the case where the recess is not provided. That is, the deflectable piece is more easily deflected as compared to the case where the recess is not provided. Therefore, when the second connector is attached to the first connector, the deflectable piece is more easily deflected, whereby the engaging portion and the engaged portion can be more easily engaged. Further, when the second connector is detached from the first connector, the deflectable piece is more easily deflected, whereby the engaging portion and the engaged portion can be more easily disengaged.

[13] Preferably, the slide member includes at least one thick portion thicker than the deflectable piece, and the thick portion projects in a deflecting direction of the deflectable piece when the second connector is attached to the first connector.

According to this configuration, since the slide member includes the thick portion thicker than the deflectable piece and the thick portion projects in the deflecting direction of the deflectable piece when the second connector is attached to the first connector, a space required for the deflection of the deflectable piece can be easily secured. That is, a deflection space for the deflectable piece needs to be secured separately from a thickness range of the thick portion in a configuration in which the thick portion projects in a direction opposite to the deflecting direction of the deflectable piece, but this need can be avoided and the space required for the deflection of the deflectable piece can be easily secured.

[14] Preferably, the first connector housing includes a pair of guide grooves substantially facing each other in a pair of side walls constituting the second opening, the slide member includes a pair of guide portions to be at least partly fit into the guide grooves and is slidable in the first direction and the first opposite direction by the guide portions being guided by the guide grooves, only one of the pair of guide portions constitutes the thick portion, and the thick portion is at least partly fittable into the one guide groove and the thick portion is not fittable into the other guide groove.

According to this configuration, since only the one guide portion, out of the pair of guide portions, constitutes the thick portion, the thick portion can be at least partly fit into the one guide groove and the thick portion cannot be fit into the other guide groove, the erroneous assembly of the slide member is prevented.

[15] Preferably, the slide member includes at least one projecting portion substantially projecting toward the first terminal member.

According to this configuration, since the slide member includes the projecting portion projecting toward the first terminal member, a part provided with the projecting portion is prevented from being largely deflected by the projecting portion coming into contact with the first terminal member, for example, even if the part provided with the projecting portion is going to be largely deflected toward the first terminal member. Therefore, the part provided with the projecting portion is suppressed from being largely deflected toward the first terminal member to be broken.

[16] Preferably, the slide member includes at least one reinforcing rib for reinforcing the projecting portion.

According to this configuration, since the slide member includes the reinforcing rib for reinforcing the projecting portion, the breakage of the projecting portion is suppressed, for example, even if the projecting portion collides with the first terminal member.

[17] Preferably, the slide member includes a pair of the deflectable pieces and a center piece substantially extending along the deflectable pieces and provided between the pair of deflectable pieces, and the center piece includes a projecting portion projecting toward the first terminal member.

According to this configuration, since the slide member includes the pair of deflectable pieces and the center piece substantially extending along the deflectable pieces and provided between the pair of deflectable pieces, the second opening can be closed to reduce a clearance, for example, by the pair of deflectable pieces and the center piece arranged side by side. Therefore, the electric shock prevention measure is improved. Since the center piece includes the projecting portion projecting toward the first terminal member, the center piece is prevented from being largely deflected by the projecting portion coming into contact with the first terminal member, for example, even if the center piece is going to be largely deflected toward the first terminal member. Therefore, the center piece is suppressed from being largely deflected toward the first terminal member to be broken.

[18] The second connector of the present disclosure is a second connector attachable to and detachable from a first connector, in particular according to the above aspect of the invention or a particular embodiment thereof, the first connector including at least one first terminal member having a tip side extending in a first direction, a first connector housing for holding the first terminal member, and at least one slide member to be held in the first connector housing, the first connector housing including a protecting portion for at least partly covering the first terminal member except a part on a side in a second direction orthogonal to the first direction, out of surrounding sides orthogonal to the first direction, a first opening open in the first direction in the protecting portion, and a second opening open in the second direction in the protecting portion, and the slide member being slidable in a first opposite direction substantially opposite to the first direction from a closing position for at least partly closing the second opening to an opening position, the second connector including at least one pressing portion for sliding or displacing the slide member to the opening position by pressing or engaging at least one pressed portion provided on the slide member when the second connector is attached to the first connector, and at least one engaging portion for sliding or displacing the slide member to the closing position by pulling or engaging at least one engaged portion provided in the slide member when the second connector is detached from the first connector.

According to this configuration, since the second connector includes the pressing portion for sliding the slide member to the opening position by pressing the pressed portion provided on the slide member when the second connector is attached to the first connector, the slide member needs not be slid to the opening position, for example, by a jig or the like. That is, the worker can slide the slide member to the opening position without requiring another operation step only by attaching the second connector to the first connector. Further, since the second connector includes the engaging portion for sliding the slide member to the closing position by pulling the engaged portion provided in the slide member when the second connector is detached from the first connector, the slide member needs not be slid to the closing position, for example, by a jig or the like. That is, the worker can slide the slide member to the closing position without requiring another operation step only by detaching the second connector from the first connector.

[19] Preferably, the second connector has a third inclined surface inclined with respect to a plane orthogonal to an attaching/detaching direction of the first and second connectors, and the third inclined surface guides the engaging portion to a position where the engaging portion is engageable with the engaged portion when the second connector is attached to the first connector.

According to this configuration, since the second connector has the third inclined surface for guiding the engaging portion to the position where the engaging portion is engageable with the engaged portion when the second connector is attached to the first connector, the engaging portion and the engaged portion can be easily engaged. That is, the second connector can be easily and properly attached to the first connector.

[20] Preferably, the engaging portion has a fourth inclined surface inclined with respect to a plane orthogonal to the attaching/detaching direction of the first and second connectors, and the fourth inclined surface guides and disengages the engaging portion and the engaged portion with the slide member held or positioned at the closing position when the second connector is detached from the first connector.

According to this configuration, since the engaging portion has the fourth inclined surface for guiding and disengaging the engaging portion and the engaged portion with the slide member held at the closing position when the second connector is detached from the first connector, the engaging portion and the engaged portion can be easily disengaged. That is, the second connector can be easily and properly detached from the first connector.

[21] The connector assembly of the present disclosure includes a first connector as described above and a second connector as described above attachable to and detachable from the first connector.

[22] According to another aspect, The connector assembly of the present disclosure includes a first connector and a second connector attachable to and detachable from the first connector, wherein the first connector includes a first terminal member having a tip side extending in a first direction, a first connector housing for holding the first terminal member, and a slide member to be held in the first connector housing, the first connector housing including a protecting portion for covering the first terminal member except a part on a side in a second direction orthogonal to the first direction, out of surrounding sides orthogonal to the first direction, a first opening open in the first direction in the protecting portion, and a second opening open in the second direction in the protecting portion, and the slide member being slidable in a first opposite direction opposite to the first direction from a closing position for closing the second opening to an opening position, and the second connector includes a pressing portion for sliding the slide member to the opening position by pressing a pressed portion provided on the slide member when the second connector is attached to the first connector, and an engaging portion for sliding the slide member to the closing position by pulling an engaged portion provided in the slide member when the second connector is detached from the first connector.

According to this configuration, since the slide member is provided which is slidable from the closing position for closing the second opening open in the second direction to the opening position, the provision of a protecting member in the second direction of the first terminal member is unnecessary. Thus, the configuration of the first terminal member can be simplified while an electric shock prevention measure is provided.

Further, since the second connector includes the pressing portion for sliding or displacing the slide member to the opening position by pressing or engaging the pressed portion provided on the slide member when the second connector is attached to the first connector, the slide member needs not be slid to the opening position, for example, by a jig or the like. That is, the worker can slide or displace the slide member to the opening position without requiring another operation step only by attaching the second connector to the first connector. Further, since the second connector includes the engaging portion for sliding the slide member to the closing position by pulling the engaged portion provided in the slide member when the second connector is detached from the first connector, the slide member needs not be slid to the closing position, for example, by a jig or the like. That is, the worker can slide the slide member to the closing position without requiring another operation step only by detaching the second connector from the first connector.

According to the first connector, second connector and connector assembly of the present disclosure, the configuration of a terminal can be simplified while an electric shock prevention measure is provided.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

A specific example of a connector assembly of the present disclosure is described below with reference to the drawings. In each figure, some of components may be shown in an exaggerated or simplified manner for the convenience of description. Further, a dimension ratio of each part may be different in each figure. "Parallel" and "orthogonal" in this specification mean not only strictly parallel and orthogonal, but also substantially parallel and orthogonal within a range in which functions and effects in the embodiment are achieved. Note that the present invention is not limited to these illustrations and is intended to be represented by claims and include all changes in the scope of claims and in the meaning and scope of equivalents.

Figure 1:
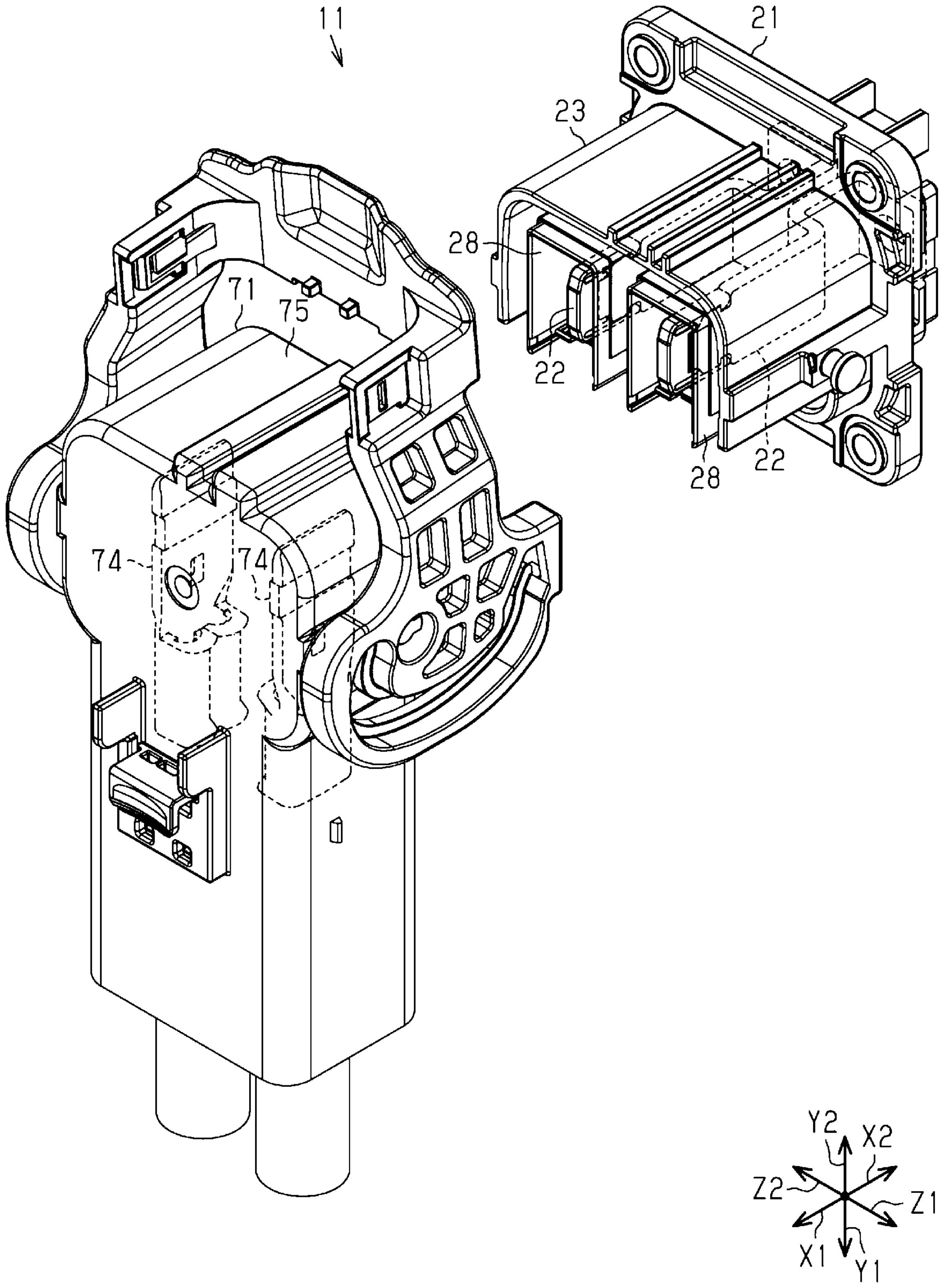
FIG. 1 is an exploded perspective view of a connector assembly in one embodiment.
Figure 2:
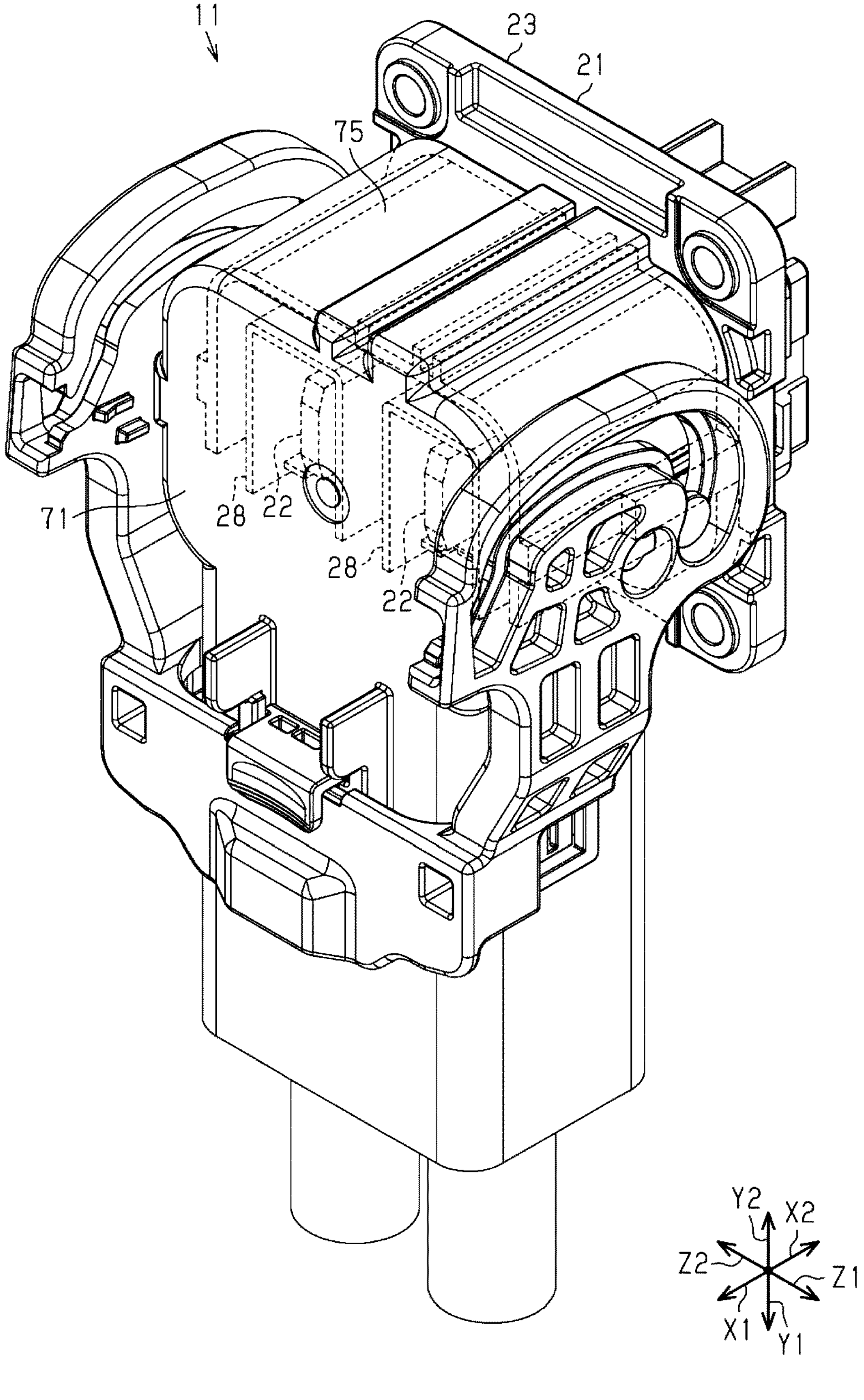
FIG. 2 is a perspective view of the connector assembly in the one embodiment.

As shown in FIGS. 1 and 2, a connector assembly 11 includes a first connector 21 and a second connector 71 attachable to and detachable from the first connector 21. The connector assembly 11 particularly is provided in a vehicle. For example, the vehicle includes one or more in-vehicle devices such as a high-voltage battery and an inverter, and those one or more in-vehicle devices are connected via a wiring harness. The connector assembly 11 is, for example, provided as a component for connecting the in-vehicle device and the wiring harness.

[Configuration of First Connector 21]

Figure 3:
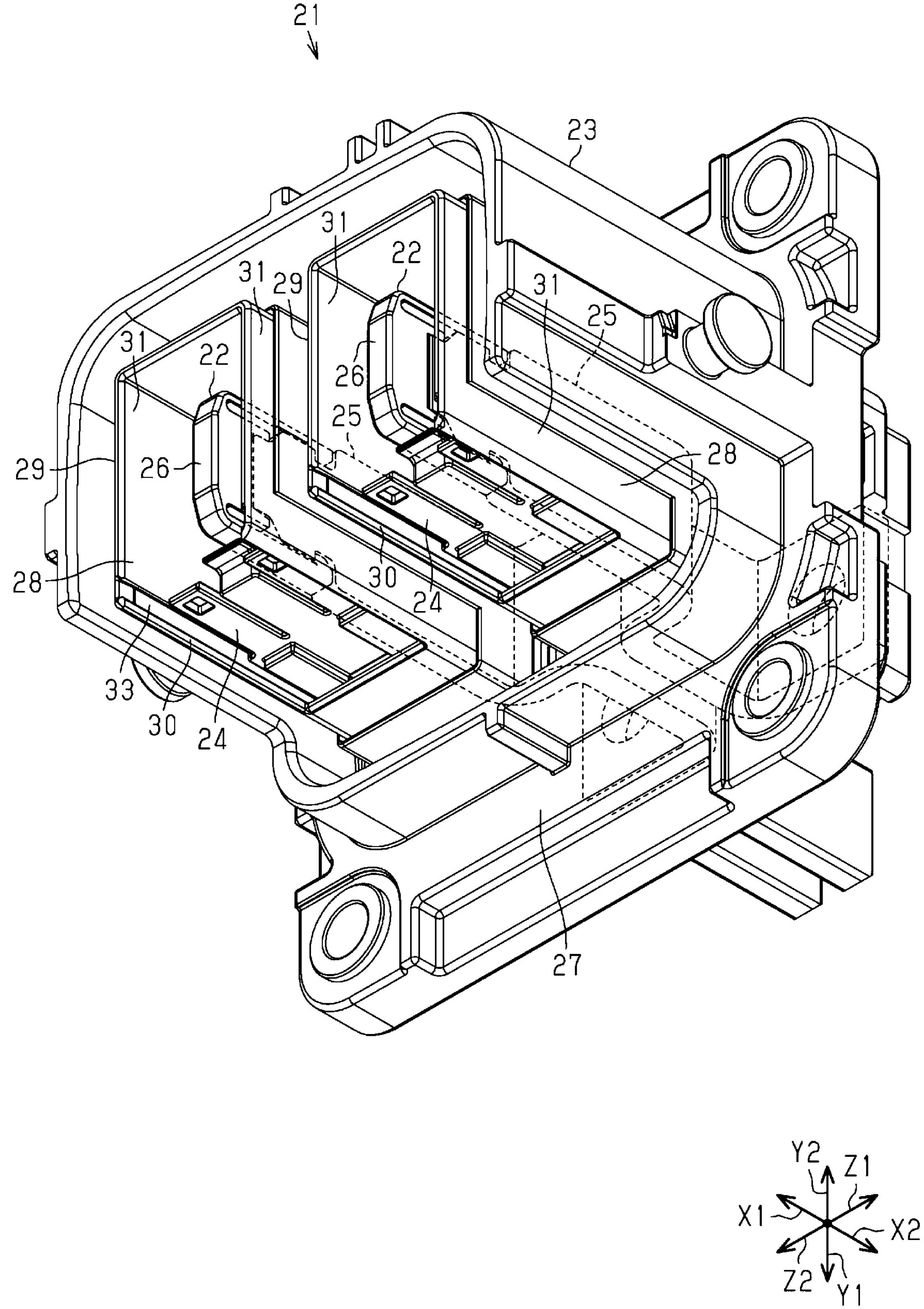
FIG. 3 is a perspective view of a first connector in the one embodiment.
Figure 4:
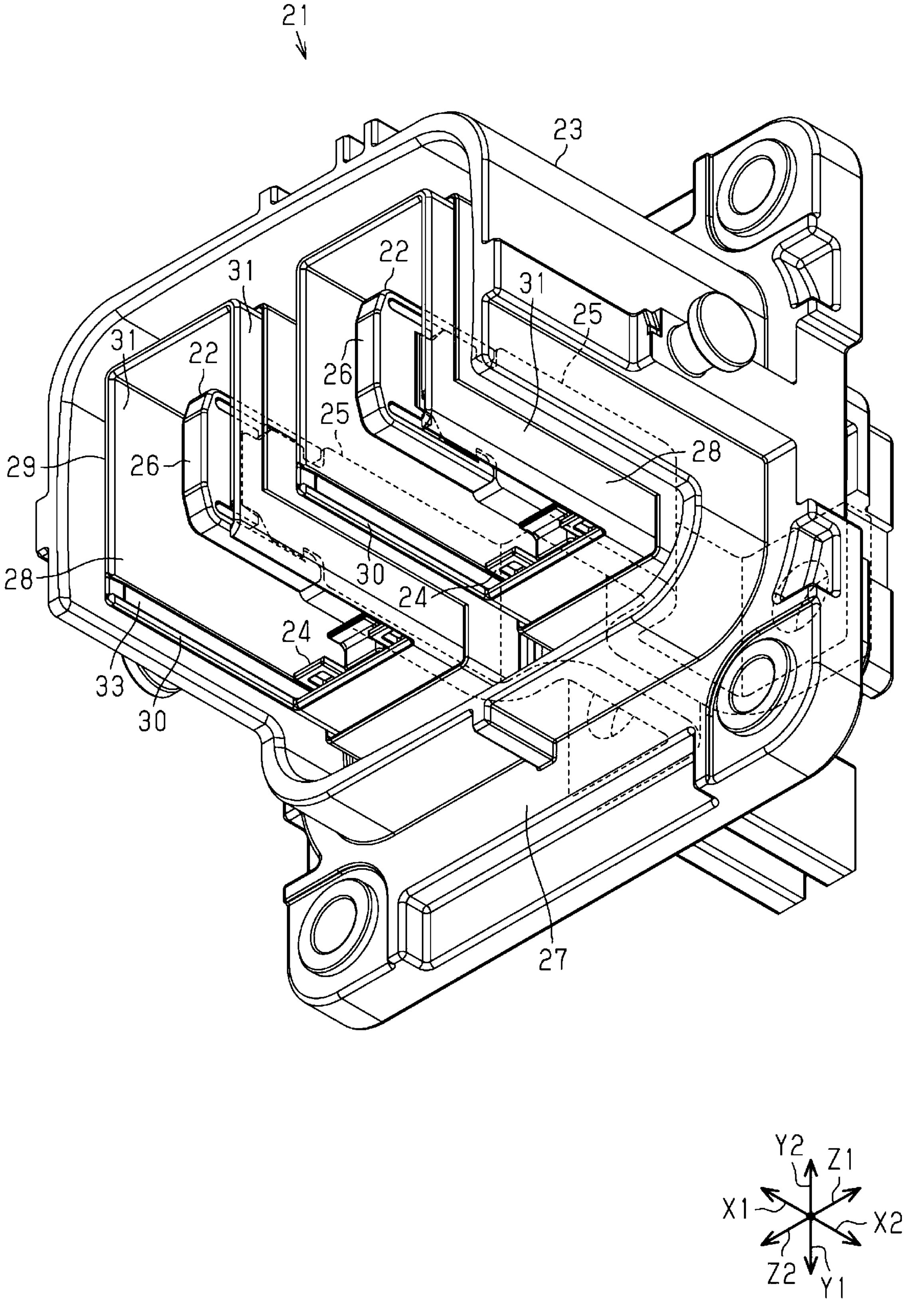
FIG. 4 is a perspective view of the first connector in the one embodiment.

As shown in FIGS. 3 and 4, the first connector 21 includes one or more first terminal members 22, a first connector housing 23 and one or more slide members 24. In this embodiment, an extending direction of the first terminal members 22 is described as a first direction X1. That is, tip sides of the first terminal members 22 substantially extend in the first direction X1. The first connector housing 23 holds the first terminal members 22. The slide members 24 particularly are to be held in the first connector housing 23.

[Configuration of First Terminal Members 22]

The first terminal member 22 particularly includes a terminal 25 and a protecting member 26. The terminal 25 particularly substantially is plate-like. The terminal 25 is made of a conductive material such as a metal plate material. The protecting member 26 particularly is made of an insulating resin material. The protecting member 26 is fixed to a tip side of the terminal 25, i.e. a side in the first direction X1 of the terminal 25. Two first terminal members 22 are provided.

[Configuration of First Connector Housing 23]

The first connector housing 23 particularly is made of an insulating resin material. The first connector housing 23 includes a base portion 27 and one or more protecting portions 28.

The base portion 27 holds one or more base end sides of the respective first terminal member(s) 22. The protecting portion 28 at least partly covers the first terminal member 22 except a part on a side in a second direction Y orthogonal to the first direction X1, out of sides orthogonal to the first direction X1. In particular, the protecting portion 28 is shaped by cutting a side in the first direction X1 of a surface facing in the second direction Y1 in a (particularly substantially rectangular or polygonal) tube extending in the first direction X1. By this configuration, the first connector housing 23 includes one or more first openings 29 open in the first direction X1 in the protecting portions 28 and/or one or more second openings 30 open in the second direction Y1 in the protecting portions 28. Two protecting portions 28 specifically are provided to correspond to the number of the first terminal members 22.

The protecting portion 28 at least partly covers both surfaces in a thickness direction of the first terminal member 22 by a pair of side walls 31 particularly constituting the second opening 30. Note that one side in the thickness direction of the first terminal member 22 substantially is facing in a third direction Z1 orthogonal to the first direction X1 and second direction Y1, and the other side in the thickness direction of the first terminal member 22 substantially is facing in a third opposite direction Z2 which is an opposite direction of the third direction Z1.

Figure 5:
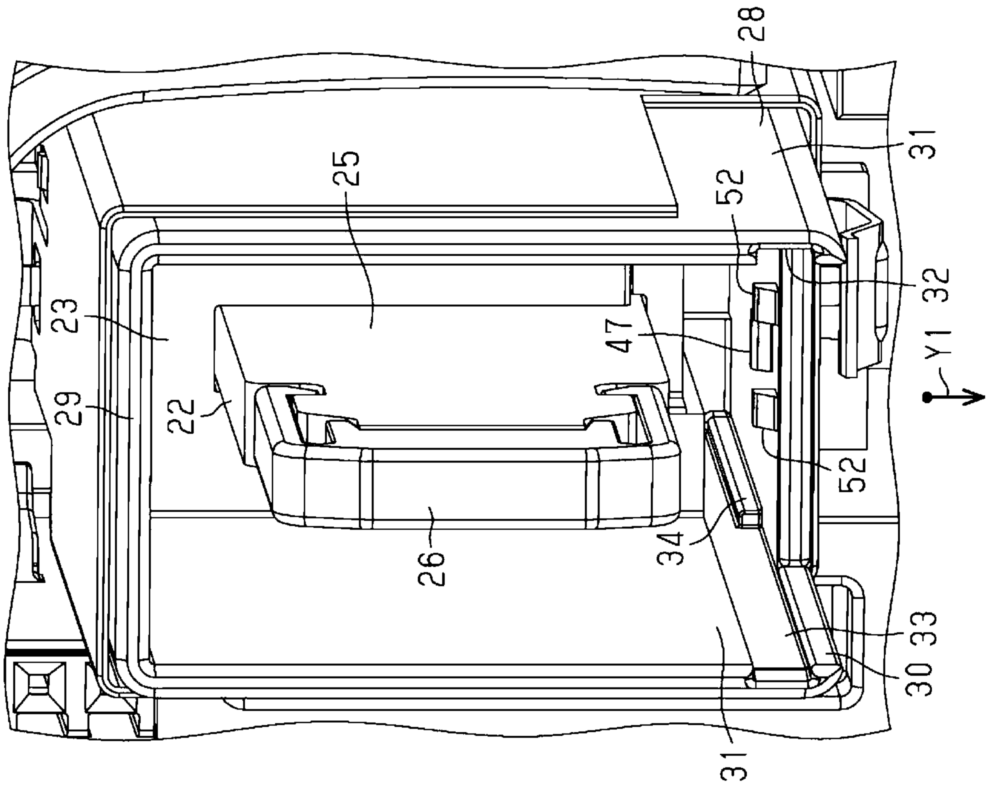
FIG. 5 is a partial perspective view of the first connector in the one embodiment.
Figure 6:
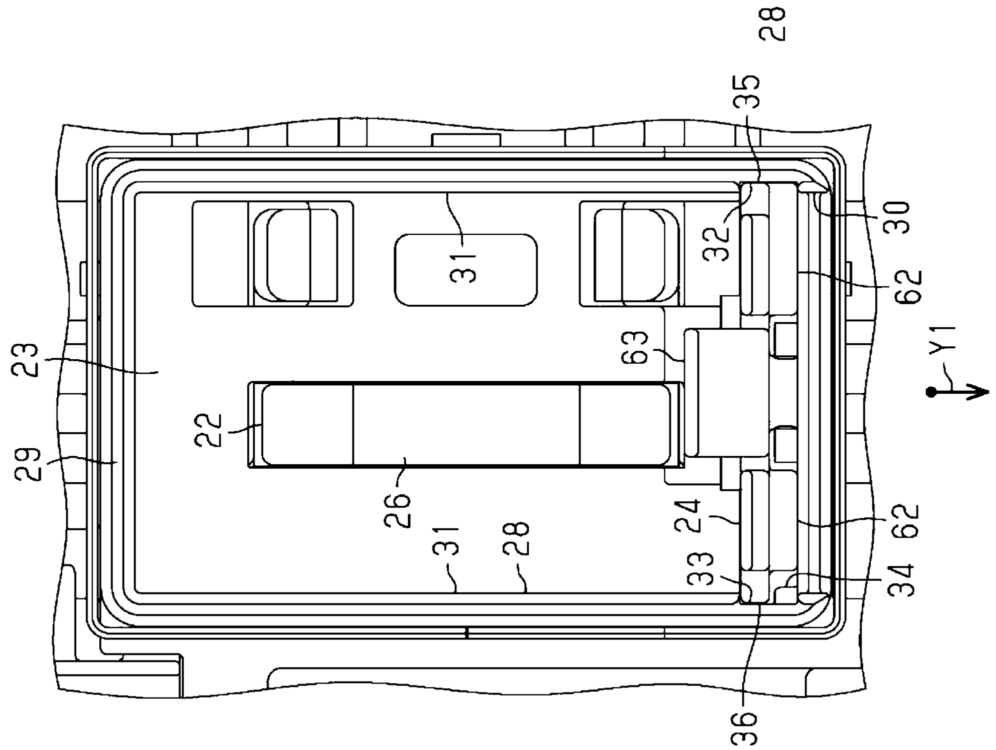
FIG. 6 is a partial front view of the first connector in the one embodiment.

Further, as shown in FIGS. 5 and 6, the first connector housing 23 includes one or more, particularly a pair of guide grooves 32, 33 substantially facing the (particularly pair of) side wall(s) 31 particularly constituting the second opening 30. One guide groove 32 and the other guide groove 33 particularly have different shapes. In this embodiment, the other guide groove 33 includes a projection 34 on a side in the second direction Y1. Note that FIG. 5 shows a part of the first connector housing 23 in a state where the slide member 24 is not held.

[Configuration of Slide Member 24]

As shown in FIGS. 7 to 10, the slide member 24 particularly substantially is plate-like. The slide member 24 is made of an insulating resin material. The slide member 24 is slidable in a first opposite direction X2 opposite to the first direction X1 from a closing position (see FIG. 3) for closing the second opening 30 to an opening position (see FIG. 4). In particular, the slide member 24 includes one or more, particularly a pair of guide portions 35, 36 to be at least partly fit into the guide grooves 32, 33 on one or both widthwise sides. The slide member 24 is slidable in the first direction X1 and first opposite direction X2 by the guide portion(s) 35, 36 being guided by the guide groove(s) 32, 33. Note that the above closing position for closing the second opening 30 may be any position where the second opening 30 at least partly is closed to such an extent that a finger does not reach the first terminal member 22 through the second opening 30, and the slide member 24 does not necessarily seal the second opening 30 even at the closing position.

Figure 11:
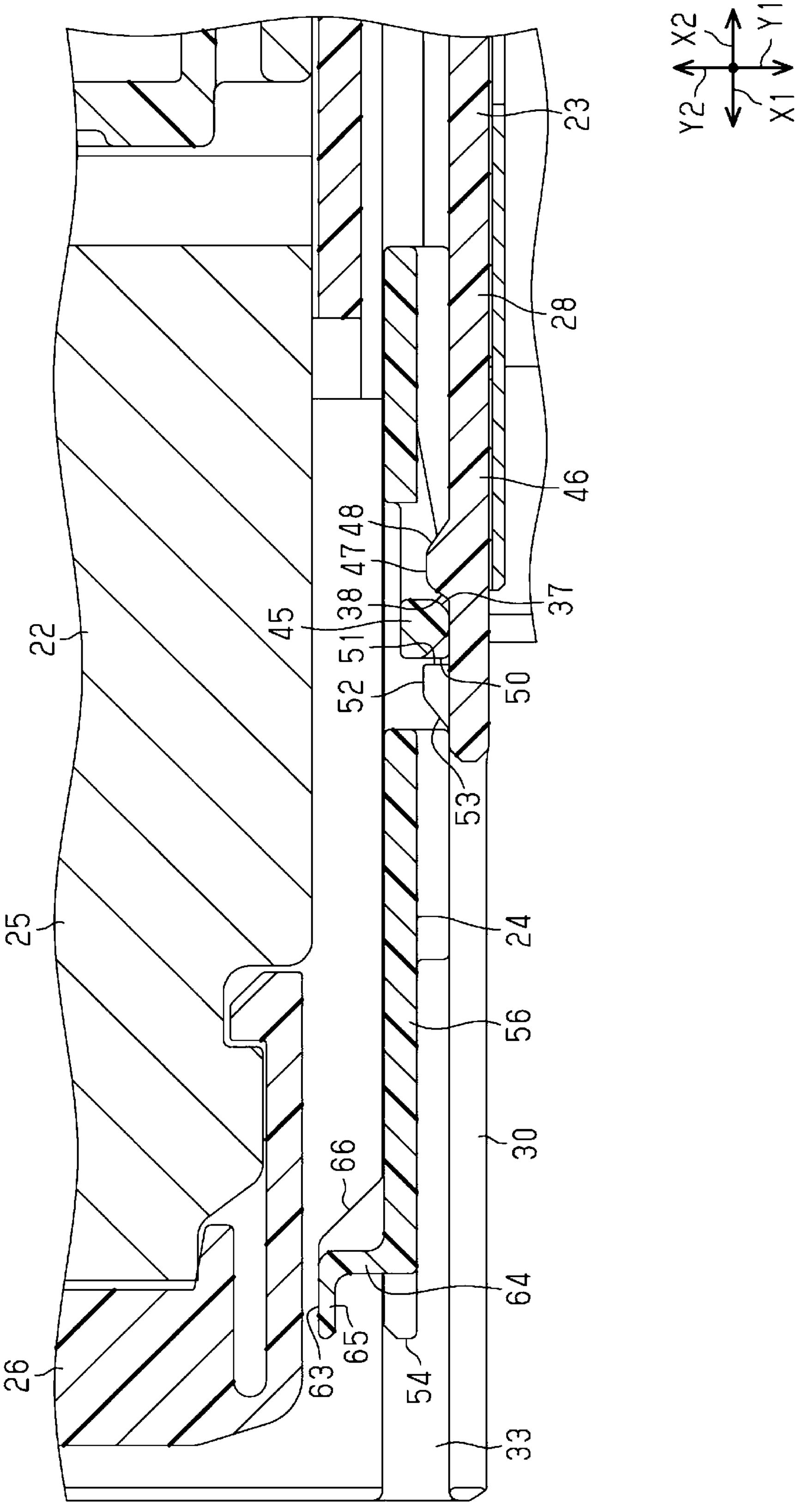
FIG. 11 is a partial section of the first connector in the one embodiment.
Figure 12:
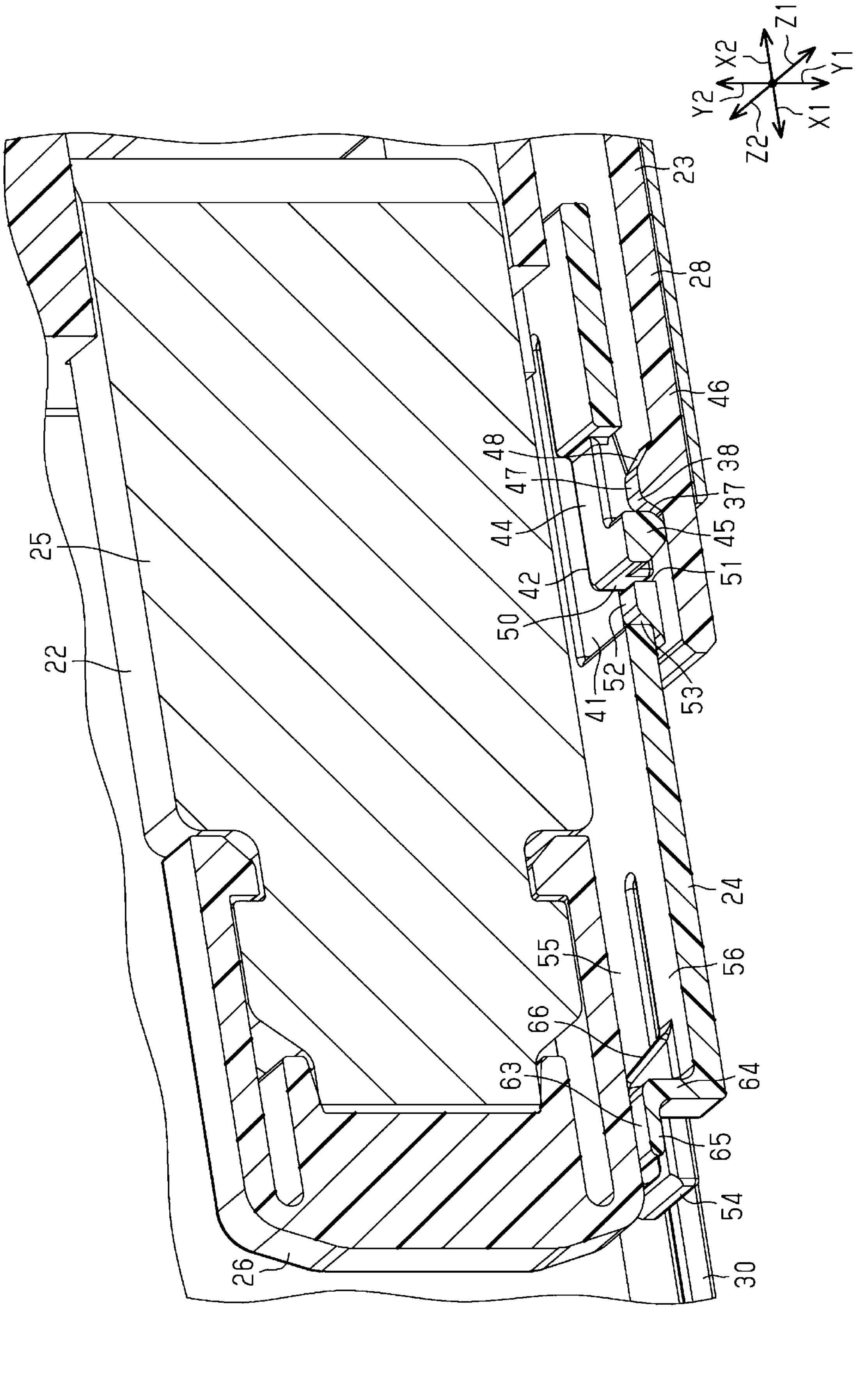
FIG. 12 is a perspective view partly in section of the first connector in the one embodiment.

As shown in FIGS. 11 and 12, the slide member 24 includes at least one slide-side suppressing portion 37. The first connector housing 23 includes at least one connector-side suppressing portion 38 for suppressing a movement of the slide member 24 in the first opposite direction X2 by being engaged with the slide-side suppressing portion 37 with the slide member 24 held at the closing position.

Figure 7:
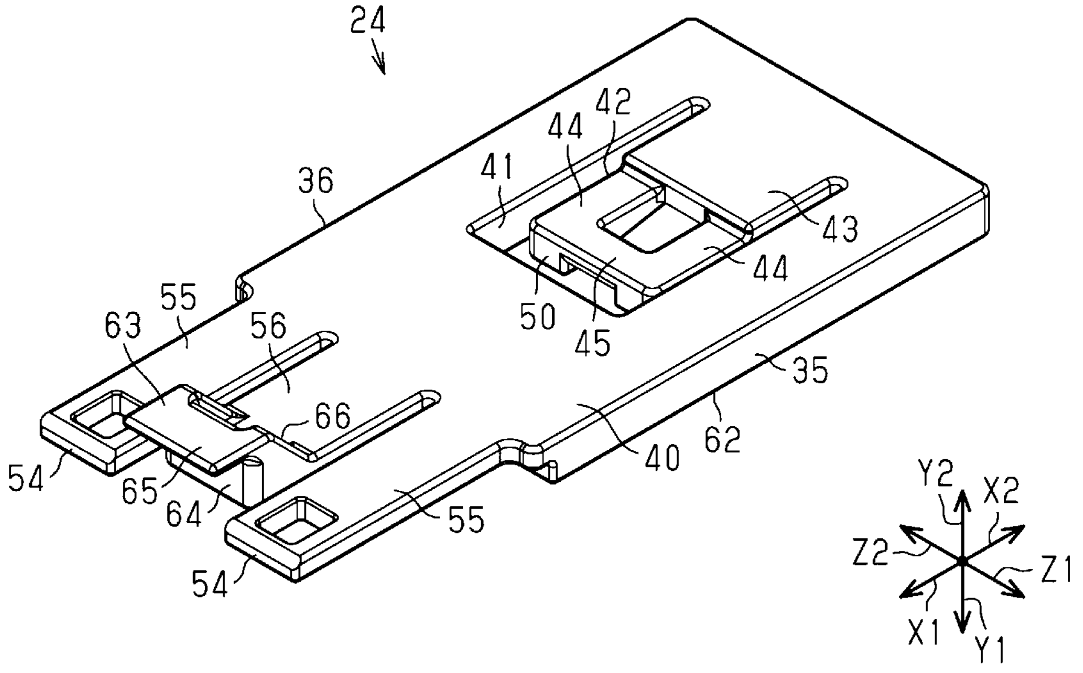
FIG. 7 is a perspective view of a slide member in the one embodiment.
Figure 8:
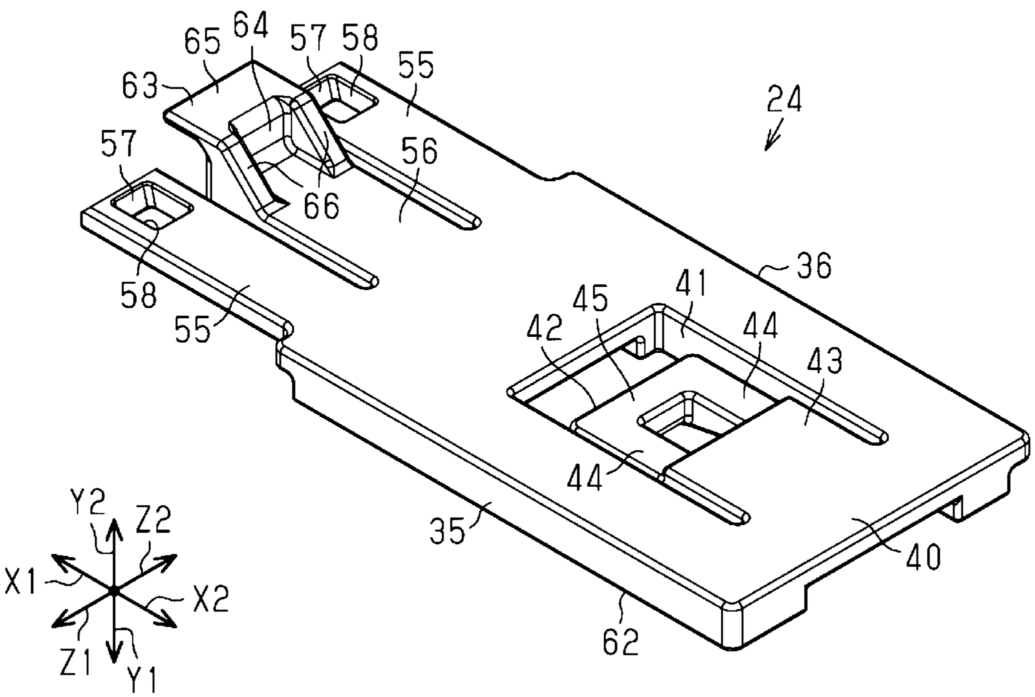
FIG. 8 is a perspective view of the slide member in the one embodiment.
Figure 10:
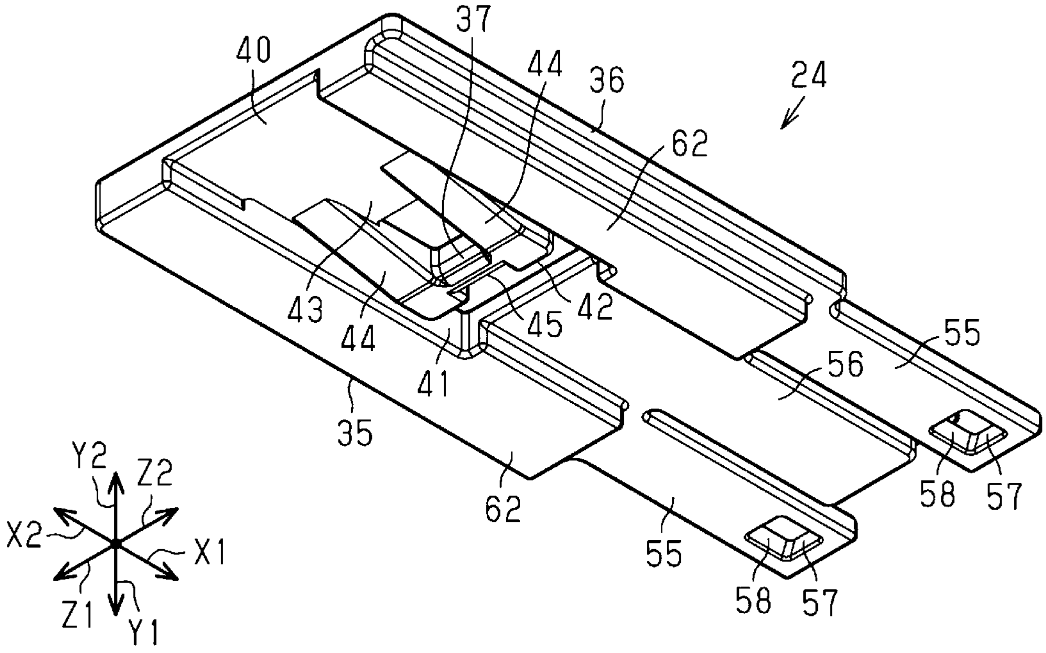
FIG. 10 is a perspective view of the slide member in the one embodiment.

Specifically, as shown in FIG. 7, the slide member 24 includes a (particularly substantially plate-like) base portion 40, a penetrating portion 41 penetrating in a thickness direction, i.e. the second direction Y1 in a center of the base portion 40, and an engaging piece 42 extending from (particularly an inner edge part of) the penetrating portion 41. The engaging piece 42 particularly includes a base piece 43, both side pieces 44 and a coupling piece 45. The base piece 43 substantially extends in the first direction X1 from (particularly the inner edge part in the first opposite direction X2 of) the penetrating portion 41. The one or both side pieces 44 substantially extend in the first direction X1 from one or both sides of (particularly a tip part of) the base piece 43 while forming one or more tiny steps in the second direction Y1. The coupling piece 45 particularly couples tip parts of the both side pieces 44. As shown in FIG. 10, a surface in the first opposite direction X2 of the coupling piece 45 serves as the slide-side suppressing portion 37.

As shown in FIGS. 11 and 12, the connector-side suppressing portion 38 is provided on a base or lower wall 46 in the second direction Y1 of the protecting portion 28. The lower wall 46 includes at least one suppressing projection 47 substantially projecting in a second opposite direction Y2 opposite to the second direction Y1. A surface in the first direction X1 of the suppressing projection 47 particularly serves as the connector-side suppressing portion 38 substantially inclined toward the first opposite direction X2 toward a top part of the suppressing projection 47. Further, a surface in the first opposite direction X2 of the suppressing projection 47 particularly substantially is an inclined surface 48 inclined toward the first direction X1 toward the top of the suppressing projection 47.

Even if a force is applied in the first opposite direction X2 from a state where the slide member 24 is at the closing position, a movement of the slide member 24 in the first opposite direction X2 particularly is suppressed by the engagement of the slide-side suppressing portion 37 with the connector-side suppressing portion 38 until a force of a set value or larger is applied. If the force of the set value or larger is applied in the first opposite direction X2 from the state where the slide member 24 is at the closing position, the engaging piece 42 at least partly is deflected, the coupling piece 45 rides over the suppressing projection 47, the slide-side suppressing portion 37 is disengaged from the connector-side suppressing portion 38 and/or the slide member 24 moves in the first opposite direction X2.

The slide member 24 includes one or more slide-side restricting portions 50. Further, the first connector housing 23 includes one or more connector-side restricting portions 51 for restricting a movement of the slide member 24 in the first direction X1 by being engaged with the respective slide-side restricting portion(s) 50 with the slide member 24 held at the closing position.

Specifically, the one or more slide-side restricting portions 50 of this embodiment are configured by surfaces in the first direction X1 of the both side pieces 44 of the engaging piece 42. Further, the one or more connector-side restricting portions 51 are provided on the lower wall 46. The one or more connector-side restricting portions 51 are provided at one or more positions corresponding to the slide-side restricting portion(s) 50. The lower wall 46 includes one or more restricting projections 52 substantially projecting in the second opposite direction Y2. The connector-side restricting portion 51 particularly is constituted by a surface in the first opposite direction X2 of the restricting projection 52. Further, a surface in the first direction X1 of the restricting projection 52 particularly is an inclined surface 53 substantially inclined toward the first opposite direction X2 toward a top part of the restricting projection 52.

Even if a force is applied in the first direction X1 from the state where the slide member 24 is at the closing position, a movement in the first direction X1 particularly is restricted by the engagement of the slide-side restricting portions 50 with the connector-side restricting portions 51. Note that since the slide-side restricting portion(s) 50 and the connector-side restricting portion(s) 51 are engaged by flat surface(s) at an angle different from 0° or 180°, particularly substantially orthogonal to the first direction X1, it is suppressed that the engaging piece 42 is deflected and the coupling piece 45 rides over the restricting projections 52.

The slide member 24 includes one or more pressed portions 54 to be pressed by one or more later-described pressing portions 72 (see FIGS. 14 and 15) provided in the second connector 71 when the second connector 71 is attached to the first connector 21. The slide member 24 slides to the opening position by the pressed portion(s) 54 being pressed by the pressing portion(s) 72.

Specifically, the slide member 24 includes one or more, particularly a pair of deflectable pieces 55 and a center piece 56 provided adjacent to the deflectable piece(s) 55, particularly substantially between the pair of deflectable pieces 55. The deflectable piece 55 includes a base end part connected to the base portion 40 and a tip part provided on a side opposite to the base end part in the first direction X1. The deflectable piece 55 substantially extends in the first direction X1 from the base portion 40 and/or is flexible in a direction at an angle different from 0° or 180°, particularly substantially orthogonal to the first direction X1, in particular, the second direction Y1. The pressed portions 54 particularly are constituted by the tip surfaces of the deflectable pieces 55. Two pressed portions 54 are provided by being provided on the respective deflectable pieces 55.

The slide member 24 includes one or more engaged portions 57 to be pulled or engaged by one or more later-described engaging portions 73 (see FIG. 15) provided in the second connector 71 when the second connector 71 is detached from the first connector 21. The slide member 24 slides to the closing position by the engaged portion(s) 57 being pulled or engaged by the engaging portion(s) 73.

Specifically, a tip part of the deflectable piece 55 includes an engaging hole 58 penetrating in the thickness direction, i.e. the second direction Y1. The engaged portion 57 particularly is constituted by an inner wall surface in the first connector X1 in the engaging hole 58. One or more, particularly two engaged portions 57 are provided by being provided in the respective deflectable piece(s) 55. Further, the pressed portion(s) 54 and the engaged portion(s) 57 are arranged in an attaching/detaching direction of the first and second connectors 21, 71. Further, the engaged portion 57 particularly has a first inclined surface 60 inclined with respect to a plane orthogonal to the attaching/detaching direction of the first and second connectors 21, 71. In this embodiment, the first inclined surface 60 particularly is provided over the entire surface of the engaged portion 57. The one or more first inclined surfaces 60 particularly guide and disengage the engaging portions 73 and/or the engaged portions 57 with the slide member 24 held at the closing position when the second connector 71 is detached from the first connector 21.

The slide member 24 has one or more second inclined surfaces 61 inclined with respect to the plane orthogonal to the attaching/detaching direction of the first and second connectors 21, 71. In this embodiment, the second inclined surface(s) 61 is/are provided on either one or both sides in the second opposite direction Y2 of the pressed portions 54. The second inclined surface(s) 61 guide(s) the engaging portion(s) 73 to position(s) where the engaging portion(s) 73 is/are engageable with the engaged portion(s) 57 when the second connector 71 is attached to the first connector 21.

The slide member 24 includes one or more thick portions 62 thicker than the deflectable piece(s) 55. The thick portions 62 particularly are provided to project in the second direction Y1, which is a deflecting direction of the deflectable pieces 55 when the second connector 71 is attached to the first connector 21.

Figure 9:
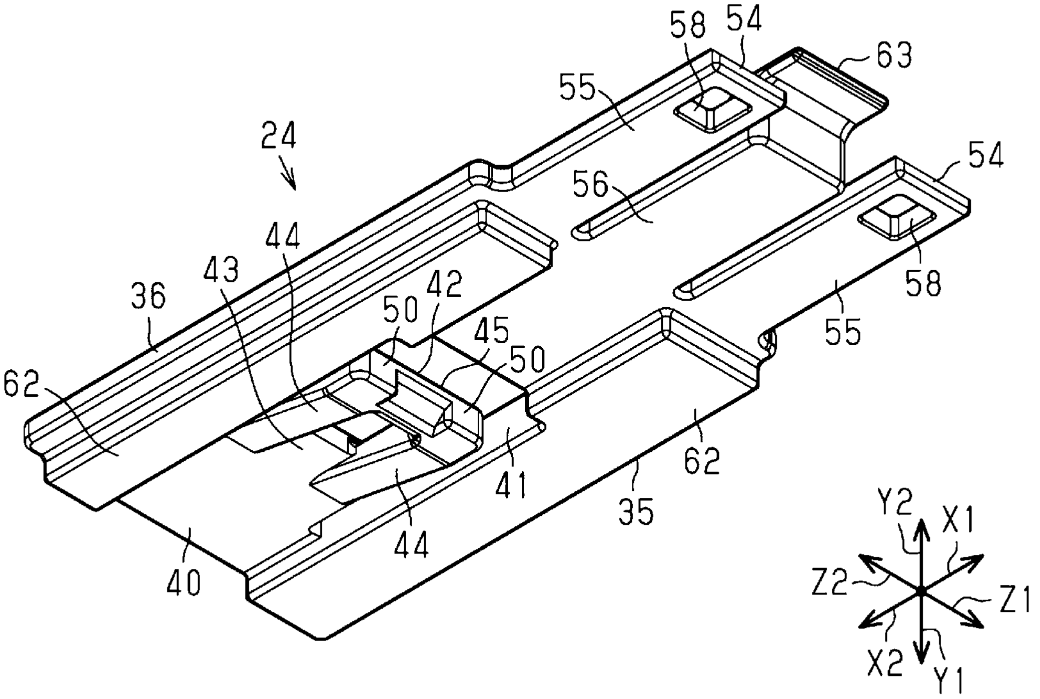
FIG. 9 is a perspective view of the slide member in the one embodiment.

Specifically, the one or more thick portions 62 are provided on either one or both sides of the base portion 40. Further, as shown in FIGS. 6 and 9, particularly only one guide portion 35, out of the pair of guide portions 35, 36, constitutes the thick portion 62. In other words, the one guide portion 35 particularly has a thickness corresponding to the thick portion 62, and the other guide portion 36 has only a thickness of the base portion 40. As show in FIG. 6, the thick portion 62 can be at least partly fit into the one guide groove 32 described above, and the thick portion 62 cannot be fit into the other guide groove 33 including the projection 34. In this way, the erroneous assembly of the slide member 24 into the first connector housing 23 is prevented.

The slide member 24 particularly includes a projecting portion 63 projecting toward the first terminal member 22.

Specifically, the projecting portion 63 is provided on the tip of the center piece 56. The projecting portion 63 substantially is bent or L-shaped. In particular, the projecting portion 63 includes a first piece 64 projecting in the second opposite direction Y2 from the tip of the center piece 56 and a second piece 65 extending in the first direction X1 form the tip of the first piece 64. Further, the slide member 24 includes one or more reinforcing ribs 66 for reinforcing the projecting portion 63. The reinforcing rib(s) 66 particularly is/are provided from side parts of the first piece 64 to the center piece 56.

[Configuration of Second Connector 71]

Figure 13:
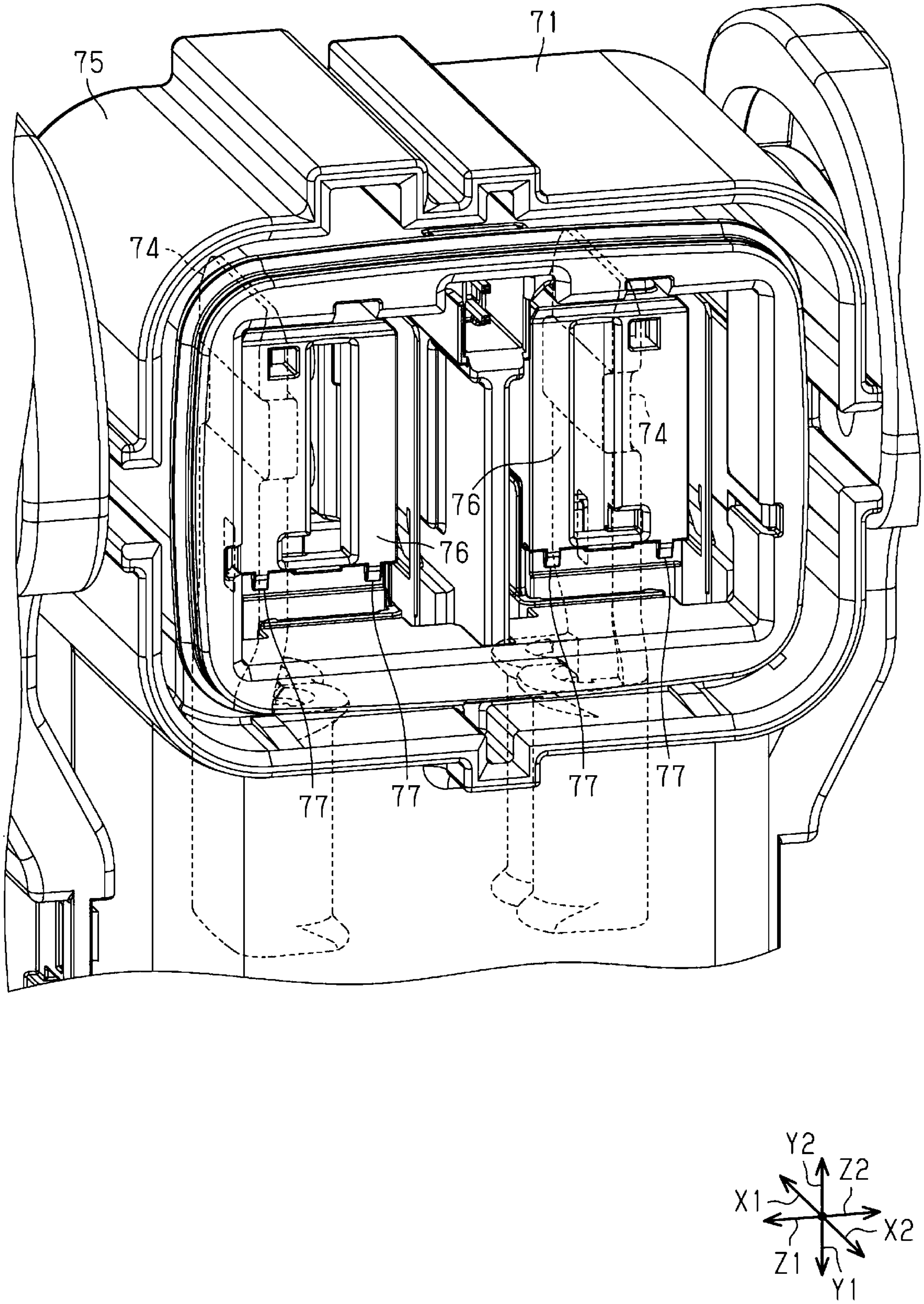
FIG. 13 is a partial perspective view of a second connector in the one embodiment.

As shown in FIGS. 1 and 13, the second connector 71 includes one or more second terminal members 74 and a second connector housing 75. The second connector housing 75 holds the one or more second terminal members 74. The second connector housing 75 is attachable to and detachable from the first connector housing 23. Tip sides of the second terminal members 74 substantially extend in the second opposite direction Y2. Note that the description of directions including the second opposite direction Y2 in the second connector 71 are based on a state where the second connector 72 is attached to the first connector 21. One or more, e.g. two second terminal members 74 are provided to correspond to the number of the first terminal members 22 of the first connector 21.

Figure 16:
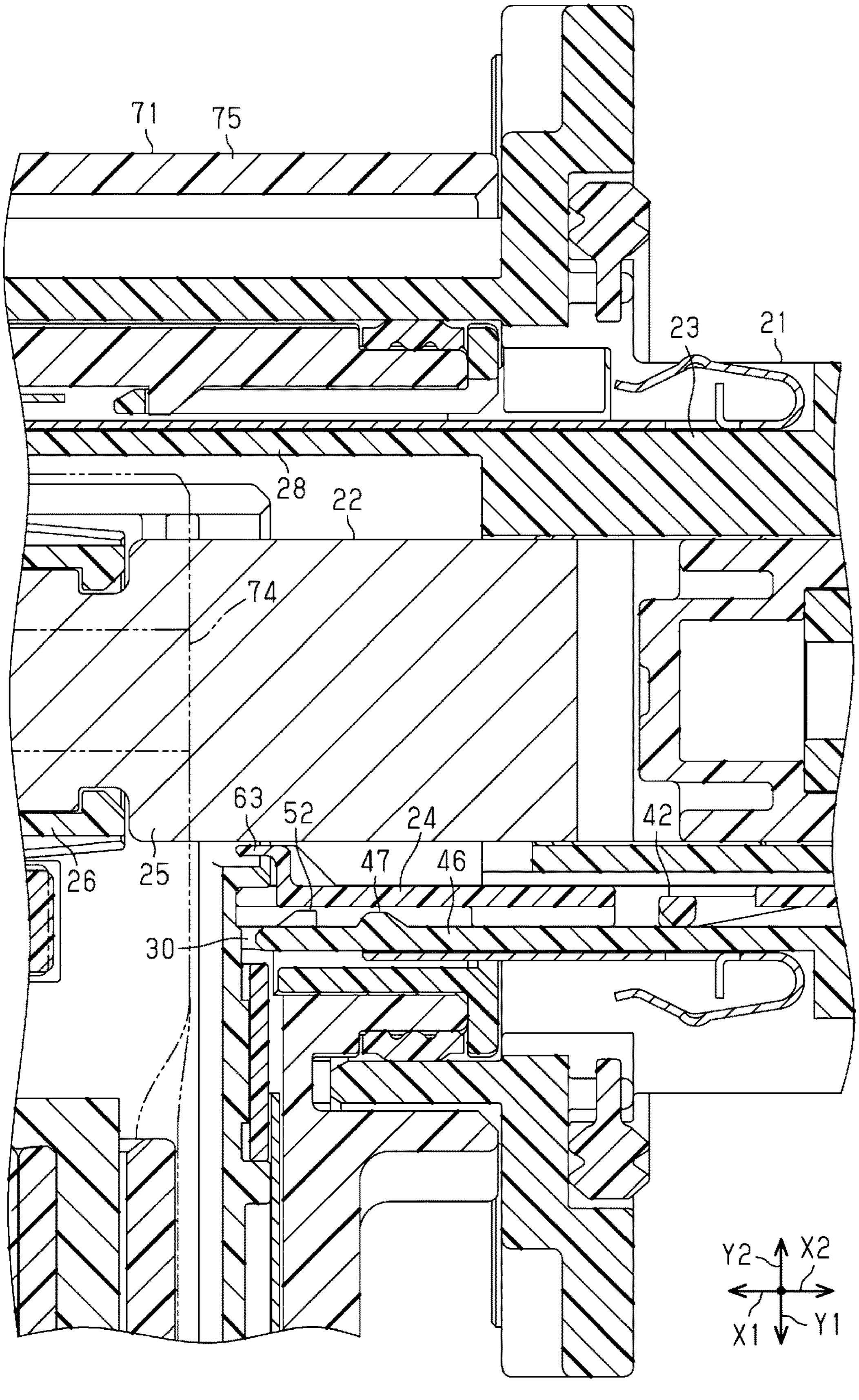
FIG. 16 is a partial section of the connector assembly in the one embodiment.

As shown in FIG. 16, the tip part of the second terminal member 74 is in contact with and electrically connected to the terminal 25 of the first terminal member 22 with the second connector 71 attached to the first connector 21. Further, the second terminal member 74 is arranged to pass through the second opening 30 with the second connector 71 attached to the first connector 21.

The second connector 71 includes the pressing portion(s) 72 and/or the engaging portion(s) 73 described above.

Figure 14:
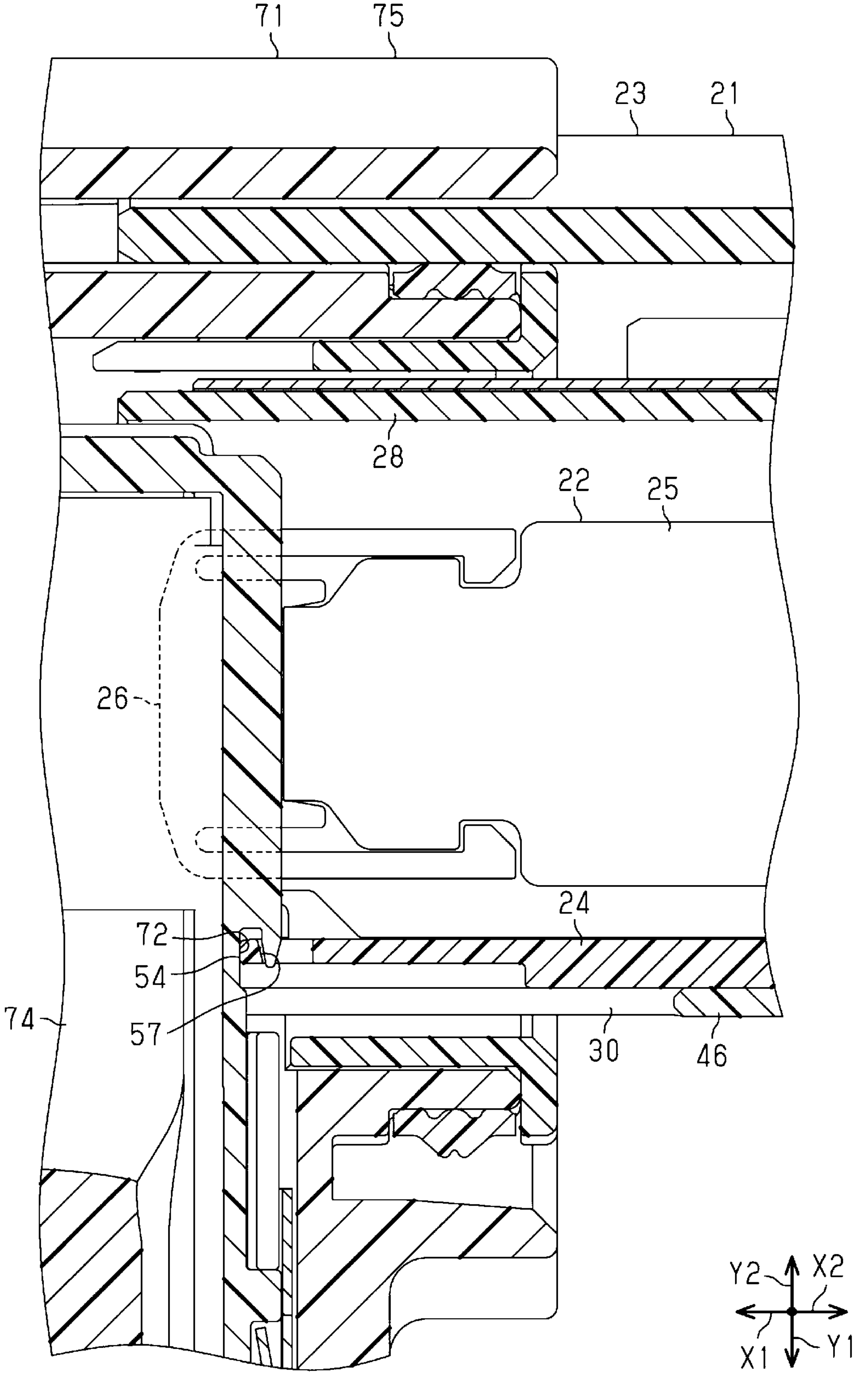
FIG. 14 is a partial section of the connector assembly in the one embodiment.
Figure 15:
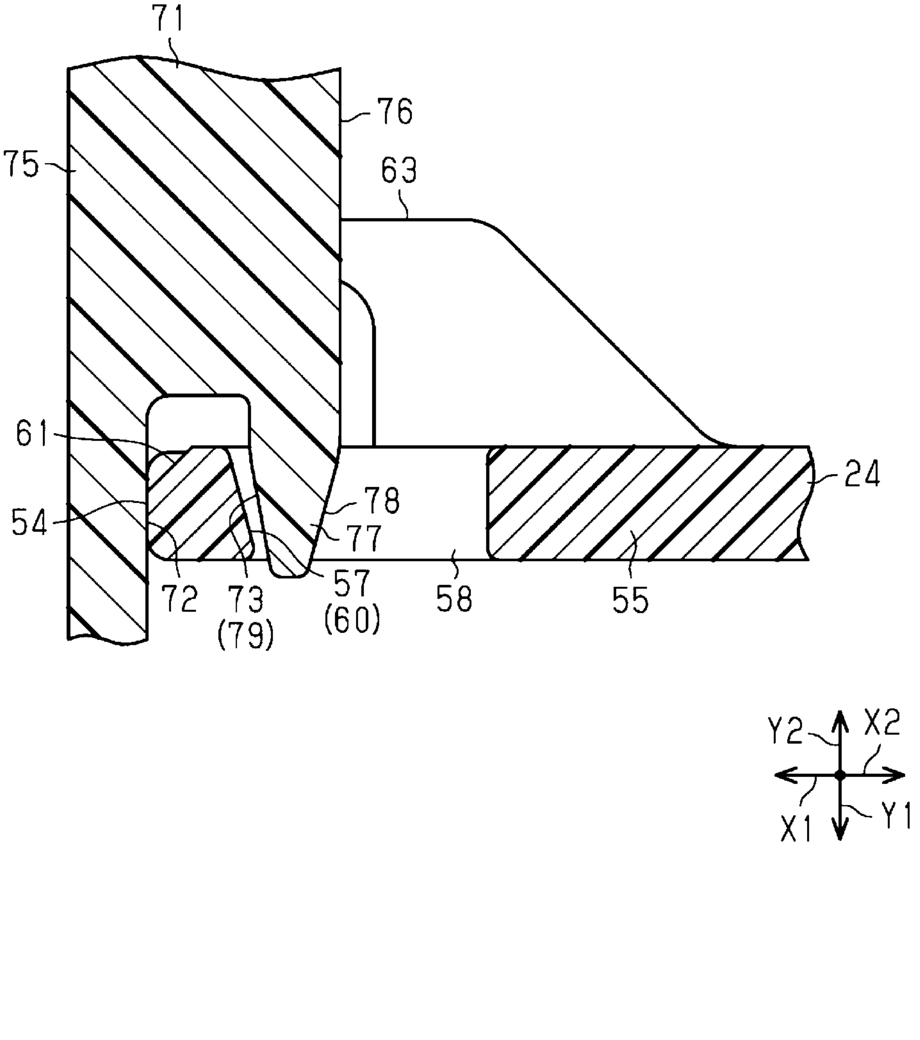
FIG. 15 is a partial section of the connector assembly in the one embodiment.

As shown in FIGS. 14 and 15, the pressing portion(s) 72 particularly is/are provided at position(s) corresponding to the pressed portion(s) 54 of the slide member 24 in the second connector housing 75. The pressing portion(s) 72 particularly slide(s) the slide member 24 to the opening position by pressing the pressed portion(s) 54 when the second connector 71 is attached to the first connector 21.

As shown in FIG. 15, the engaging portion(s) 73 particularly is/are provided at position(s) corresponding to the engaged portion(s) 57 of the slide member 24 in the second connector housing 75. The engaging portion(s) 73 particularly slide(s) the slide member 24 to the closing position by pulling or engaging the engaged portion(s) 57 when the second connector 71 is detached from the first connector 21.

Specifically, the second connector housing 75 includes one or more projections 76 projecting in the first opposite direction X2 from the same plane as the pressing portion(s) 72. The second connector housing 75 also includes one or more claws 77 projecting in the second direction Y1 from position(s) substantially corresponding to the engaged portion(s) 57 on the tip(s) of the projection(s) 76. The engaging portion 73 particularly is constituted by a surface in the first direction X1 of the claw 77. The second connector housing 75 particularly also has one or more third inclined surfaces 78 inclined with respect to a plane orthogonal to the attaching/detaching direction of the first and second connectors 21, 71. The third inclined surface 78 is constituted by a surface in the first opposite direction X2 of the claw 77. The third inclined surface(s) 78 particularly guide(s) the engaging portion(s) 73 to the position(s) where the engaging portion(s) 73 is/are engageable with the engaged portion(s) 57 when the second connector 71 is attached to the first connector 21. Further, the engaging portion 73 particularly has a fourth inclined surface 79 inclined with respect to the plane orthogonal to the attaching/detaching direction of the first and second connectors 21, 71. In this embodiment, the fourth inclined surface 79 particularly is provided over the entire surface of the engaging portion 73. The fourth inclined surface(s) 79 guide(s) and/or disengage(s) the engaging portion(s) 73 and the engaged portion(s) 57 with the slide member 24 held at the closing position when the second connector 71 is detached from the first connector 21.

Next, functions of the connector assembly 11 configured as described above are described.

As shown in FIG. 3, in a state before the second connector 71 is attached to the first connector 21, the slide member(s) 24 particularly is/are at the closing position for closing the second opening(s) 30, thereby suppressing, for example, the contact of worker's fingers with the terminals 25 of the first terminal members 22 through the second opening(s) 30. Further, since the protecting member(s) 26 particularly is/are fixed on the tip side(s) of the terminal(s) 25, the contact of the worker's fingers with the terminal(s) 25 of the first terminal member(s) 22 through the first opening(s) 29 is, for example, suppressed.

When the second connector 71 is attached to the first connector 21, the one or more claws 77 first contact the pressed portion(s) 54 of the slide member(s) 24, but the one or more claws 77 at least partly are fit into the engaging hole(s) 58 by the deflection of the deflectable piece(s) 55 in the second direction Y1 by the action of the second and third inclined surface(s) 61, 78. In this way, as shown in FIG. 15, the engaging portion(s) 73 particularly is/are arranged at the position(s) where the engaging portion(s) 73 is/are engageable with the engaged portion(s) 57.

Subsequently, the pressed portion(s) 54 particularly is/are pressed by the pressing portion(s) 72. In this way, the slide member(s) 24 is/are slid to the opening position. With the second connector 71 attached to the first connector 21, the first and second terminal members 22, 74 are electrically connected as shown in FIG. 16.

When the second connector 71 is detached from the first connector 21, the one or more engaged portions 57 are pulled or engaged by the one or more engaging portions 73. In this way, the slide member(s) 24 is/are slid to the closing position. Subsequently, the one or more deflectable pieces 55 are deflected in the second direction Y1 by the action of the first and fourth inclined surfaces 60, 79, whereby the one or more claws 77 come out from the engaging hole(s) 58. In this way, the engaging portion(s) 73 and the engaged portion(s) 57 are disengaged and the second connector 71 is detached from the first connector 21. In this state, the slide member(s) 24 particularly return(s) to the closing position to close the second opening(s) 30, thereby suppressing, for example, the contact of the worker's fingers with the terminal(s) 25 of the first terminal members 22 through the second opening(s) 30.

Next, effects of the above embodiment are described below.

(1) Since the slide member 24 particularly is provided which is slidable from the closing position for closing the second opening 30 open in the second direction Y1 to the opening position, the provision of a protecting member in the second direction Y1 of the first terminal member 22 is unnecessary. Thus, the configuration of the first terminal member 22 can be simplified while an electric shock prevention measure is provided.

(2) Since the first connector housing 23 particularly includes the one or more connector-side suppressing portions 38 for suppressing movements of the slide member(s) 24 at the closing position in the first opposite direction X2, the slide member(s) 24 is/are suppressed from easily sliding to the opening portion due to vibration or the like. Thus, the electric shock prevention measure is improved.

Further, as in this embodiment, the one or more slide members 24 are suppressed from sliding in the first opposite direction X2 before the claws 77 at least partly are fit into the engaging holes 58.

(3) Since the first connector housing 23 particularly includes the one or more connector-side restricting portions 51 for restricting movements of the slide member(s) 24 at the closing position in the first direction X1, the escape of the slide member(s) 24 from the first connector housing 23 is restricted. Thus, the electric shock prevention measure is improved.

(4) Since the slide member 24 particularly slides to the opening position by the one or more pressed portions 54 being pressed by the one or more pressing portions 72 of the second connector 71 when the second connector 71 is attached to the first connector 21, the slide member 24 needs not be slid to the opening position, for example, by a jig or the like. That is, the worker can slide the slide member 24 to the opening position without requiring another operation step only by attaching the second connector 71 to the first connector 21.

(5) Since the slide member 24 particularly includes a plurality of the pressed portions 54, the slide member 24 can be smoothly and stably slid to the opening position as compared to a configuration including a single pressed portion 54.

(6) Since the slide member 24 particularly slides to the closing position by the engaged portion(s) 57 being pulled or engaged by the engaging portion(s) 73 of the second connector 71 when the second connector 71 is detached from the first connector 72, the slide member 24 needs not to be slid to the closing position, for example, by a jig or the like. That is, the worker can slide the slide member 24 to the closing position without requiring another operation step only by detaching the second connector 71 from the first connector 21.

Further, if the slide member 24 particularly is biased in the first direction X1 by a biasing member such as a spring, the slide member 24 can be slid to the closing position without requiring another operation step, but this embodiment does not require the biasing member unlike this configuration.

(7) Since the slide member 24 particularly includes a plurality of the engaged portions 57, the slide member 24 can be smoothly and stably slid to the closing position as compared to a configuration including a single engaged portion 57.

(8) Since the pressed portion(s) 54 and the engaged portion(s) 57 particularly are arranged in the attaching/detaching direction of the first and second connectors 21, 71, the slide member 24 can be reduced in size in the width direction, for example, as compared to the case where these are shifted in the width direction.

(9) The engaged portion 57 particularly has the first inclined surface 60 for guiding and disengaging the engaging portion 73 and the engaged portion 57 with the slide member 24 held at the closing position when the second connector 71 is detached from the first connector 21. Thus, the engaging portion 73 and the engaged portion 57 can be easily disengaged. That is, the second connector 71 can be easily and properly detached from the first connector 21.

(10) Since the slide member 24 has the one or more second inclined surfaces 61 for guiding the one or more engaging portions 73 to the position(s) where the engaging portion(s) 73 is/are engageable with the engaged portion(s) 57 when the second connector 71 is attached to the first connector 21, the engaging portion(s) 73 and the engaged portion(s) 57 can be easily engaged. That is, the second connector 71 can be easily and properly attached to the first connector 21.

(11) Since the slide member 24 particularly includes the one or more deflectable pieces 55 extending in the first direction X1 and flexible in the direction orthogonal to the first direction X1 and the one or more engaged portions 57 are provided in the deflectable piece(s) 55, the engaging portion(s) 73 and the engaged portion(s) 57 can be easily engaged by the deflection of the deflectable piece(s) 55. That is, the engaging portion(s) 73 and the engaged portion(s) 57 can be easily engaged by the deflection of the deflectable piece(s) 55 when the second connector 71 is attached to the first connector 21. Further, the engaging portion(s) 73 and the engaged portion(s) 57 can be easily disengaged by the deflection of the deflectable piece(s) 55 when the second connector 71 is detached from the first connector 21.

(12) Since the slide member 24 includes the one or more thick portions 62 thicker than the deflectable piece(s) 55 and the thick portion(s) 62 project(s) in the deflecting direction of the deflectable piece(s) 55 when the second connector 71 is attached to the first connector 21, spaces for the deflection of the deflectable piece(s) 55 can be easily secured. That is, spaces for the deflection of the deflectable piece(s) 55 need to be secured separately from a thickness range of the thick portion(s) 62 in a configuration in which the thick portion(s) 62 project in a direction opposite to the deflecting direction of the deflectable pieces 55. However, this need can be avoided and the spaces for the deflection of the deflectable piece(s) 55 can be easily secured.

(13) Specifically, only the one guide portion 35, out of the pair of guide portions 35, 36 of the slide member 24, constitutes the thick portion 62. The thick portion 62 at least partly is fittable into the one guide groove 32, and the thick portion 62 cannot be fit into the other guide groove 33. Thus, the erroneous assembly of the slide member 24 is prevented.

(14) Since the slide member 24 particularly includes the projecting portion 63 substantially projecting toward the first terminal member 22, a part provided with the projecting portion 63 is prevented from being largely deflected by the projecting portion 63 coming into contact with the first terminal member 22, for example, even if the part provided with the projecting portion 63 is going to be largely deflected toward the first terminal member 22. Therefore, the part provided with the projecting portion 63 is, for example, suppressed from being largely deflected toward the first terminal member 22 to be broken.

(15) Since the slide member 24 particularly includes the one or more reinforcing ribs 66 for reinforcing the projecting portion 63, the breakage of the projecting portion 63 is suppressed, for example, even if the projecting portion 63 collides with the first terminal member 22.

(16) The slide member 24 particularly includes the pair of deflectable pieces 55 and the center piece 56 substantially extending along the delectable pieces 55 and/or provided between the pair of delectable pieces 55. Thus, the second opening 30 can be closed to reduce a clearance, for example, by the pair of delectable pieces 55 and the center piece 56 arranged side by side. Thus, the electric shock prevention measure is improved.

Since the center piece 56 particularly includes the projecting portion 63 projecting toward the first terminal member 22, the center piece 56 is prevented from being largely deflected by the projecting portion 63 coming into contact with the first terminal member 22, for example, even if the center piece 56 is going to be largely deflected toward the first terminal member 22. Therefore, the center piece 56 is, for example, suppressed from being largely deflected toward the first terminal member 22 to be broken.

(17) The second connector 71 particularly includes the one or more pressing portions 72 for sliding or displacing the slide member(s) 24 to the opening position by pressing or engaging the pressed portion(s) 54 provided in the slide member(s) 24 when the second connector 71 is attached to the first connector 21. Thus, the slide member(s) 24 need(s) not be slid or displaced to the opening position, for example, by a jig or the like. That is, the worker can slide the slide members 24 to the opening position without requiring another operation step only by attaching the second connector 71 to the first connector 21.

The second connector 71 particularly also includes the one or more engaging portions 73 for sliding or displacing the slide member(s) 24 to the closing position by pulling or engaging the engaged portion(s) 57 provided in the slide member(s) 24 when the second connector 71 is detached from the first connector 1. Thus, the slide member(s) 24 need(s) not be slid or displaced to the closing position, for example, by a jig or the like. That is, the worker can slide the slide member(s) 24 to the closing position without requiring another operation step only by detaching the second connector 71 from the first connector 21.

(18) The second connector housing 75 particularly has the one or more third inclined surfaces 78 for guiding the engaging portion(s) 73 to the position(s) where the engaging portion(s) 73 is/are engageable with the engaged portion(s) 57 when the second connector 71 is attached to the first connector 21. Thus, the engaging portion(s) 73 and the engaged portion(s) 57 can be easily engaged. That is, the second connector 71 can be easily and properly attached to the first connector 21.

(19) The engaging portion 73 particularly has the fourth inclined surface 79 for guiding and/or disengaging the engaging portion 73 and the engaged portion 57 with the slide member 24 held at the closing position when the second connector 71 is detached from the first connector 21. Thus, the engaging portion 73 and the engaged portion 57 can be easily disengaged. That is, the second connector 71 can be easily and properly detached from the first connector 21.

This embodiment can be modified and carried out as follows. This embodiment and the following modifications can be carried out in combination without technically contradicting each other.

Although the first connector housing 23 particularly includes the one or more connector-side suppressing portions 38 for suppressing movements of the slide members 24 at the closing position in the first opposite direction X2 in the above embodiment, the configuration of the one or more connector-side suppressing portions 38 may be changed. For example, one or more connector-side suppressing portions may be configured to suppress movements of the slide member(s) 24 in the first opposite direction X2 by the slide member 24 being press-fit thereinto at the closing position.

Although the first connector housing 23 particularly includes the one or more connector-side restricting portions 51 for restricting movements of the slide member(s) 24 at the closing position in the first direction X1 in the above embodiment, the configuration of the one or more connector-side restricting portions 51 may be changed.

Although the slide member 24 particularly includes the one or more pressed portions 54 to be pressed by the pressing portion(s) 72 of the second connector 71 when the second connector 71 is attached to the first connector 21 in the above embodiment, the configuration of the one or more pressed portions 54 may be changed. Further, the number of the pressed portions 54 may be changed to one, three or more.

Although the slide member 24 particularly includes the one or more engaged portions 57 to be pulled or engaged by the engaging portion(s) 73 of the second connector 71 when the second connector 71 is detached from the first connector 21 in the above embodiment, the configuration of the one or more engaged portions 57 may be changed. Further, the number of the engaged portions 57 may be changed to one, three or more.

Although the pressed portion(s) 54 and the engaged portion(s) 57 particularly are arranged in the attaching/detaching direction of the first and second connectors 21, 71 in the above embodiment, there is no limitation to this and the pressed portion(s) 54 and the engaged portion(s) 57 may be, for example, shifted in the width direction.

Although the engaged portion 57 particularly has the first inclined surface 60 in the above embodiment, there is no limitation to this and the engaged portion 57 may not have the first inclined surface 60. Further, although the engaging portion 73 particularly has the fourth inclined surface 79, there is no limitation to this and the engaging portion 73 may not have the fourth inclined surface 79. Note that at least one of the first inclined surface 60 and the fourth inclined surface 79 is preferably provided.

Although the slide member 24 particularly has the second inclined surface(s) 61 in the above embodiment, there is no limitation to this and the slide member 24 may not have the second inclined surface(s) 61. Further, although the second connector housing 75 particularly has the third inclined surface(s) 78, there is no limitation to this and the second connector housing 75 may not have the third inclined surface(s) 78. Note that at least either the second inclined surfaces 61 or the third inclined surfaces 78 are preferably provided.

Although the engaged portion 57 particularly is provided in the deflectable piece 55 in the above embodiment, there is no limitation to this and the engaged portion 57 may be provided in a non-flexible part. Note that, in this case, the engaging portion 73 is preferably provided on a flexible part.

Although the slide member 24 particularly includes the one or more thick portions 62 thicker the deflectable pieces 55 in the above embodiment, there is no limitation to this and the slide member 24 may not include the thick portion(s) 62.

Although only the one guide portion 35, out of the pair of guide portions 35, 36 of the slide member 24, particularly constitutes the thick portion 62 in the above embodiment, there is no limitation to this. For example, the pair of guide portions may both constitute the thick portions 62.

Although the slide member 24 particularly includes the projecting portion 63 substantially projecting toward the first terminal member 22 in the above embodiment, there is no limitation to this and the slide member 24 may not include the projecting portion 63. Further, although the slide member 24 particularly includes the one or more reinforcing ribs 66 for reinforcing the projecting portion 63, the slide member 24 may not include the reinforcing rib(s) 66.

Figure 17:
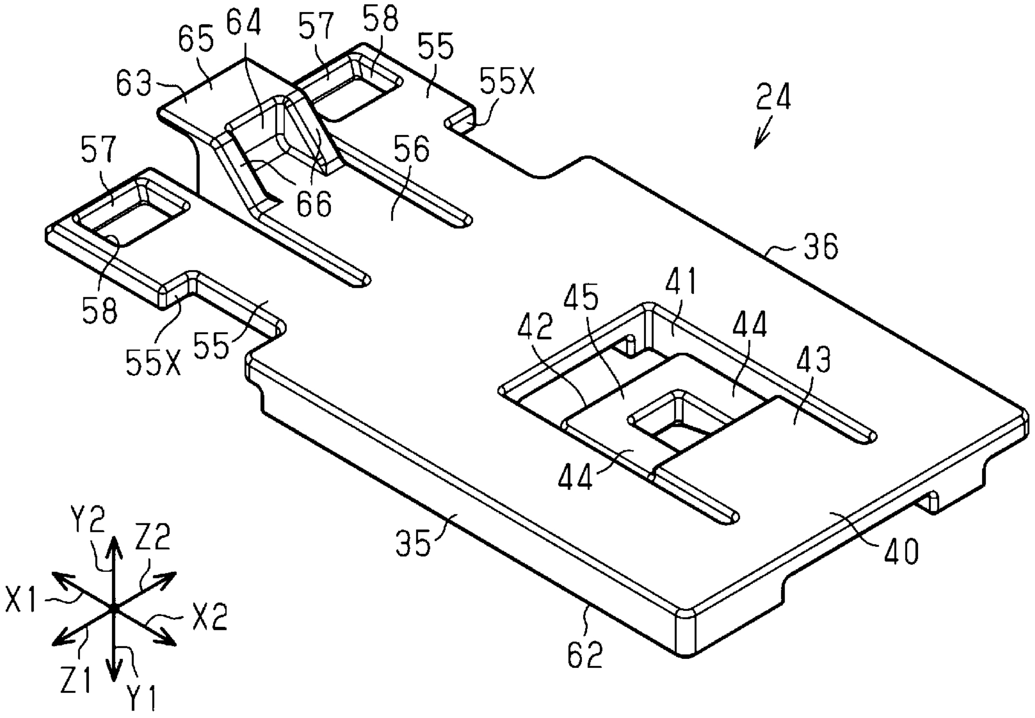
FIG. 17 is a perspective view of a slide member in a modification.
Figure 18:
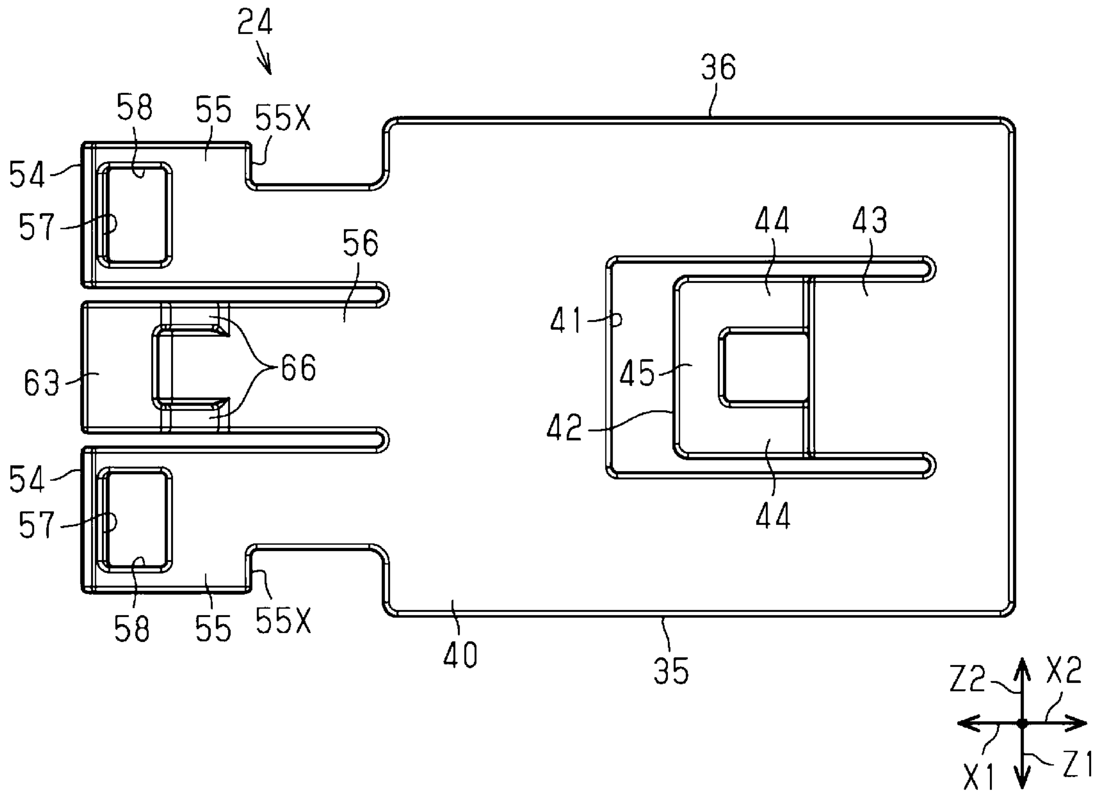
FIG. 18 is a plan view of the slide member in the modification.

For example, as shown in FIGS. 17 and 18, one or more recesses 55X may be provided in (particularly base end parts of) the deflectable piece(s) 55. The recess 55X particularly is formed to be recessed in a direction intersecting the first direction X1. The recess 55X of this modification is formed to be recessed in a direction orthogonal to both the first direction X1 in which the deflectable piece(s) 55 extend(s) and the second direction Y1 in which the deflectable piece(s) 55 is/are deflected, in particular, in the third direction Z1 or third opposite direction Z2. The recess 55X of this modification particularly is formed to be recessed toward the center piece 56 from an end surface more distant from the center piece 56, out of both widthwise end surfaces of the deflectable piece 55.

According to this configuration, the base end part of the deflectable piece 55 particularly becomes thinner by providing the recess 55X. Thus, the flexibility of the deflectable piece 55 can be improved as compared to the case where the recess 55X is not provided. That is, the deflectable piece 55 is more easily deflected in the second direction Y1 as compared to the case where the recess 55X is not provided. Therefore, when the second connector 71 is attached to the first connector 21, the deflectable piece(s) 55 is/are more easily deflected, whereby the engaging portion(s) 73 and the engaged portion(s) 57 can be more easily engaged.

Further, when the second connector 71 is detached from the first connector 21, the deflectable piece(s) 55 particularly is/are more easily deflected, whereby the engaging portion(s) 73 and the engaged portion(s) 57 can be more easily disengaged.

Although the recess 55X particularly is provided in the widthwise end surface of the deflectable piece 55 in the modification shown in FIG. 17, there is no limitation to this. For example, a recess 55X may be provided in an end surface in the second direction Y1 of the base end part of the deflectable piece 55. The recess 55X in this case is, for example, formed to be recessed in a direction orthogonal to both the first direction X1 in which the deflectable pieces 55 extend and the third direction Z1 which is the width direction of the deflectable piece 55, in particular, in the second opposite direction Y2.

The shape of the engaging hole 58 of the above embodiment is not particularly limited. For example, as shown in FIGS. 17 and 18, the engaging hole 58 particularly may be formed into a long hole. The engaging hole 58 of this modification is formed into the long hole long in the width direction of the deflectable piece. That is, the engaging hole 58 of this modification is formed into the long hole longer in the third direction Z1, which is the width direction of the deflectable piece 55, than in the first direction X1, in which the deflectable piece 55 extends.

Alternatively, the planar shape of the engaging hole 58 viewed from a penetrating direction of the engaging hole 58 may be, for example, particularly changed to a circular or elliptical shape.

Although the slide member 24 particularly includes the pair of deflectable pieces 55 and the center piece 56 provided between the pair of deflectable pieces 55 in the above embodiment, there is no limitation to this and may have another configuration. For example, only one deflectable piece 55 may be provided. Further, the center piece 56 may not, for example, be provided.

Although the second connector 71 particularly includes the pressing portions 72 for pressing or engaging the pressed portion(s) 54 provided in the slide member(s) 24 when the second connector 71 is attached to the first connector 21 in the above embodiment, the configuration of the pressing portion(s) 72 may be changed. For example, the pressing portion(s) 72 particularly may be provided on the second terminal members 74.

Although the second connector 71 particularly includes the one or more engaging portions 73 for pulling or engaging the engaged portion(s) 57 provided in the slide member(s) 24 when the second connector 71 is detached from the first connector 21 in the above embodiment, the configuration of the engaging portion(s) 73 may be changed. For example, the engaging portion(s) 73 particularly may be provided on the second terminal members 74.

Although the first connector 21 particularly includes two first terminal members 22 in the above embodiment, one, three or more first terminal members 22 may be provided.

Accordingly, to provide a first connector capable of simplifying the configuration of a terminal while providing an electric shock prevention measure, there is disclosed a first connector 21 includes a first terminal member 22 having a tip side extending in a first direction X1, a first connector housing 23 for holding the first terminal member 22, and a slide member 24 to be held in the first connector housing 23. The first connector housing 23 includes a protecting portion 28 for covering the first terminal member 22 except a part on a side in a second direction Y1 orthogonal to the first direction X1, out of surrounding sides orthogonal to the first direction X1, a first opening 29 open in the first direction X1 in the protecting portion 28, and a second opening 30 open in the second direction Y1 in the protecting portion 28. The slide member 24 is slidable in a first opposite direction X2 opposite to the first direction X1 from a closing position for closing the second opening 30 to an opening position.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A first connector, comprising:

at least one first terminal member having a tip side extending in a first direction;

a first connector housing for holding the first terminal member; and at least one slide member (24) to be held in the first connector housing, wherein:

the first connector housing includes:

a protecting portion for at least partly covering the first terminal member except a part on a side in a second direction orthogonal to the first direction, out of surrounding sides orthogonal to the first direction;

a first opening open in the first direction in the protecting portion; and a second opening open in the second direction in the protecting portion, and the slide member is slidable in a first opposite direction opposite to the first direction from a closing position for at least partly closing the second opening to an opening position.

2. The first connector according to claim 1, wherein:

the slide member includes at least one slide-side suppressing portion, and the first connector housing includes at least one connector-side suppressing portion for suppressing a movement of the slide member in the first opposite direction by being engaged with the slide-side suppressing portion with the slide member held at the closing position.

3. The first connector according to claim 1, wherein:

the slide member includes at least one slide-side restricting portion, and the first connector housing includes at least one connector-side restricting portion for restricting a movement of the slide member in the first direction by being engaged with the slide-side restricting portion with the slide member held at the closing position.

4. The first connector according to claim 1, wherein the slide member includes at least one pressed portion to be pressed by at least one pressing portion provided in a second connector when the second connector is attached to the first connector and slides to the opening position by the pressed portion being pressed by the pressing portion, and wherein the slide member preferably includes a plurality of the pressed portions.

5. The first connector according to claim 4, wherein the slide member includes at least one engaged portion to be pulled or engaged by at least one engaging portion provided in the second connector when the second connector is detached from the first connector and slides to the closing position by the engaged portion being pulled or engaged by the engaging portion, wherein the slide member preferably includes a plurality of the engaged portions.

6. The first connector according to claim 5, wherein the pressed portion and the engaged portion are arranged in an attaching/detaching direction of the first and second connectors.

7. The first connector according to claim 5, wherein:

the engaged portion has a first inclined surface inclined with respect to a plane orthogonal to an attaching/detaching direction of the first and second connectors, and the first inclined surface guides and disengages the engaging portion and the engaged portion with the slide member positioned or held at the closing position when the second connector is detached from the first connector.

8. The first connector according to claim 5, wherein:

the slide member has a second inclined surface inclined with respect to a plane orthogonal to an attaching/detaching direction of the first and second connectors, and the second inclined surface guides the engaging portion to a position where the engaging portion is engageable with the engaged portion when the second connector is attached to the first connector.

9. The first connector according to claim 5, wherein:

the slide member includes at least one deflectable piece substantially extending in the first direction and flexible in a direction orthogonal to the first direction, and the engaged portion is provided in the deflectable piece;

preferably wherein:

the deflectable piece includes a base end part and a tip part provided on a side opposite to the base end part in the first direction, the engaged portion is provided in the tip part of the deflectable piece, and the base end part of the deflectable piece includes at least one recess recessed in a direction intersecting the first direction.

10. The first connector according to claim 9, wherein:

the slide member includes at least one thick portion thicker than the deflectable piece, and the thick portion projects in a deflecting direction of the deflectable piece when the second connector is attached to the first connector, preferably wherein:

the first connector housing includes a pair of guide grooves substantially facing each other in a pair of side walls constituting the second opening, the slide member includes a pair of guide portions to be at least partly fit into the guide grooves and is slidable in the first direction and the first opposite direction by the guide portions being guided by the guide grooves, only one of the pair of guide portions constitutes the thick portion, and the thick portion at least partly is fittable into the one guide groove and the thick portion is not fittable into the other guide groove.

11. The first connector according to claim 1, wherein the slide member includes at least one projecting portion substantially projecting toward the first terminal member, wherein the slide member preferably includes at least one reinforcing rib for reinforcing the projecting portion.

12. The first connector according to claim 9, wherein:

the slide member includes a pair of the deflectable pieces and a center piece substantially extending along the deflectable pieces and provided between the pair of deflectable pieces, and the center piece includes a projecting portion projecting toward the first terminal member.

13. A second connector attachable to and detachable from a first connector, the first connector including at least one first terminal member having a tip side extending in a first direction, a first connector housing for holding the first terminal member, and at least one slide member to be held in the first connector housing, the first connector housing including a protecting portion for at least partly covering the first terminal member except a part on a side in a second direction orthogonal to the first direction, out of surrounding sides orthogonal to the first direction, a first opening open in the first direction in the protecting portion, and a second opening open in the second direction in the protecting portion, and the slide member being slidable in a first opposite direction opposite to the first direction from a closing position for at least partly closing the second opening to an opening position, the second connector comprising:

at least one pressing portion for sliding or displacing the slide member to the opening position by pressing or engaging at least one pressed portion provided on the slide member when the second connector is attached to the first connector; and at least one engaging portion for sliding the slide member to the closing position by pulling or engaging at least one engaged portion provided in the slide member when the second connector is detached from the first connector.

14. The second connector according to claim 13, comprising a third inclined surface inclined with respect to a plane orthogonal to an attaching/detaching direction of the first and second connectors, wherein:

the third inclined surface guides the engaging portion to a position where the engaging portion is engageable with the engaged portion when the second connector is attached to the first connector; and/or wherein:

the engaging portion has a fourth inclined surface inclined with respect to a plane orthogonal to an attaching/detaching direction of the first and second connectors, and the fourth inclined surface guides and disengages the engaging portion and the engaged portion with the slide member positioned or held at the closing position when the second connector is detached from the first connector.

15. A connector assembly, comprising the first connector according to claim 1 and the second connector according to claim 13 attachable to and detachable from the first connector.

* * * * *